(12) United States Patent
Williams et al.

(10) Patent No.: US 8,758,144 B2
(45) Date of Patent: Jun. 24, 2014

(54) SEPARABLE BACKLIGHTING SYSTEM

(75) Inventors: David C. Williams, Carson City, NV (US); Gregory Silva, Reno, NV (US)

(73) Assignee: IGT, Las Vegas, NV (US)

(\*) Notice: Subject to any disclaimer, the term of this patent is extended or adjusted under 35 U.S.C. 154(b) by 1560 days.

(21) Appl. No.: 11/877,611

(22) Filed: Oct. 23, 2007

(65) Prior Publication Data

US 2009/0104989 A1    Apr. 23, 2009

(51) Int. Cl.
| A63F 9/24 | (2006.01) |
| A63F 13/00 | (2014.01) |
| G06F 17/00 | (2006.01) |
| G06F 19/00 | (2011.01) |

(52) U.S. Cl.
USPC .......................................................... 463/46

(58) Field of Classification Search
USPC ............................. 463/31, 42, 46; 349/161
See application file for complete search history.

(56) References Cited

U.S. PATENT DOCUMENTS

| 3,708,219 | A | 1/1973 | Forlini et al. |
| 4,333,715 | A | 6/1982 | Brooks |
| 4,517,558 | A | 5/1985 | Davids |
| 4,607,844 | A | 8/1986 | Fullerton |
| 4,621,814 | A | 11/1986 | Stepan et al. |
| 4,659,182 | A | 4/1987 | Aizawa |
| 4,718,672 | A | 1/1988 | Okada |
| 4,911,449 | A | 3/1990 | Dickinson et al. |
| 4,912,548 | A | 3/1990 | Shanker et al. |
| 5,086,354 | A | 2/1992 | Bass et al. |
| 5,113,272 | A | 5/1992 | Reamey |
| 5,132,839 | A | 7/1992 | Travis |
| 5,319,491 | A | 6/1994 | Selbrede |
| 5,342,047 | A | 8/1994 | Heidel et al. |
| 5,364,100 | A | 11/1994 | Ludlow et al. |
| 5,375,830 | A | 12/1994 | Takemoto et al. |
| 5,376,587 | A | 12/1994 | Buchmann et al. |
| 5,393,061 | A | 2/1995 | Manship et al. |
| 5,467,893 | A | 11/1995 | Landis, II et al. |
| 5,539,547 | A | 7/1996 | Ishii et al. |
| 5,580,055 | A | 12/1996 | Hagiwara |

(Continued)

FOREIGN PATENT DOCUMENTS

| EP | 0 454 423 | 10/1991 |
| EP | 0 484 103 | 5/1992 |

(Continued)

OTHER PUBLICATIONS

"Police 911", from Wikipedia.org, 2001, downloaded Oct. 28, 2007, http://en.wikipedia.org/wiki/Police_911.

(Continued)

*Primary Examiner* — Milap Shah
*Assistant Examiner* — Jason Pinheiro
(74) *Attorney, Agent, or Firm* — Foley & Lardner LLP

(57) ABSTRACT

A gaming machine may have an optical module having a first display screen configured to output a visual image in response to a control signal, and a lighting module having light film on a first surface, a plate on a second surface, and a plurality of light sources positioned in an interior region formed by the light film and plate, wherein the plurality of light sources provide light to the optical module, and wherein the lighting module is removably coupled to the optical module such that the lighting module may be replaced or serviced without disturbing the optical module.

35 Claims, 14 Drawing Sheets

(56) References Cited

U.S. PATENT DOCUMENTS

| | | | |
|---|---|---|---|
| 5,585,821 A | 12/1996 | Ishikura et al. | |
| 5,589,980 A | 12/1996 | Bass et al. | |
| 5,745,197 A | 4/1998 | Leung et al. | |
| 5,752,881 A | 5/1998 | Inoue | |
| 5,764,317 A | 6/1998 | Sadovnik et al. | |
| 5,910,046 A | 6/1999 | Wada et al. | |
| 5,951,397 A | 9/1999 | Dickinson | |
| 5,956,180 A | 9/1999 | Bass et al. | |
| 5,967,893 A | 10/1999 | Lawrence et al. | |
| 5,993,027 A | 11/1999 | Yamamoto et al. | |
| 6,001,016 A | 12/1999 | Walker et al. | |
| 6,015,346 A | 1/2000 | Bennett | |
| 6,027,115 A | 2/2000 | Griswold et al. | |
| 6,050,895 A | 4/2000 | Luciano et al. | |
| 6,054,969 A | 4/2000 | Haisma | |
| 6,059,658 A | 5/2000 | Mangano et al. | |
| 6,135,884 A | 10/2000 | Hedrick et al. | |
| 6,159,098 A | 12/2000 | Slomiany et al. | |
| 6,213,875 B1 | 4/2001 | Suzuki | |
| 6,244,596 B1 | 6/2001 | Kondratjuk | |
| 6,251,014 B1 | 6/2001 | Stockdale et al. | |
| 6,252,707 B1 | 6/2001 | Kleinberger et al. | |
| 6,254,481 B1 | 7/2001 | Jaffe | |
| 6,315,666 B1 | 11/2001 | Mastera et al. | |
| 6,337,513 B1 | 1/2002 | Clevenger et al. | |
| 6,347,996 B1 | 2/2002 | Gilmore et al. | |
| 6,368,216 B1 | 4/2002 | Hedrick et al. | |
| 6,379,244 B1 | 4/2002 | Sagawa et al. | |
| 6,398,220 B1 | 6/2002 | Inoue | |
| 6,416,827 B1 | 7/2002 | Chakrapani et al. | |
| 6,444,496 B1 | 9/2002 | Edwards et al. | |
| 6,445,185 B1 | 9/2002 | Damadian et al. | |
| 6,491,583 B1 | 12/2002 | Gauselmann | |
| 6,503,147 B1 | 1/2003 | Stockdale et al. | |
| 6,511,375 B1 | 1/2003 | Kaminkow | |
| 6,512,559 B1 | 1/2003 | Hashimoto et al. | |
| 6,514,141 B1 | 2/2003 | Kaminkow et al. | |
| 6,517,433 B2 | 2/2003 | Loose et al. | |
| 6,517,437 B1 | 2/2003 | Wells et al. | |
| 6,547,664 B2 | 4/2003 | Saunders | |
| 6,575,541 B1 | 6/2003 | Hedrick et al. | |
| 6,585,591 B1 | 7/2003 | Baerlocher et al. | |
| D480,961 S | 10/2003 | Deadman | |
| 6,646,695 B1 | 11/2003 | Gauselmann | |
| 6,652,378 B2 | 11/2003 | Cannon et al. | |
| 6,659,864 B2 | 12/2003 | McGahn et al. | |
| 6,661,425 B1 | 12/2003 | Hiroaki | |
| 6,695,703 B1 | 2/2004 | McGahn | |
| 6,702,675 B2 | 3/2004 | Poole et al. | |
| 6,712,694 B1 | 3/2004 | Nordman | |
| 6,715,756 B2 | 4/2004 | Inoue | |
| 6,717,728 B2 | 4/2004 | Putilin | |
| 6,722,979 B2 | 4/2004 | Gilmore et al. | |
| 6,791,825 B1* | 9/2004 | Taylor | 361/679.6 |
| 6,802,777 B2 | 10/2004 | Seelig et al. | |
| 6,817,945 B2 | 11/2004 | Seelig et al. | |
| 6,817,946 B2 | 11/2004 | Motegi et al. | |
| 6,887,157 B2 | 5/2005 | LeMay et al. | |
| 6,890,259 B2 | 5/2005 | Breckner et al. | |
| 6,906,762 B1 | 6/2005 | Witehira et al. | |
| 6,937,298 B2 | 8/2005 | Okada | |
| 7,095,180 B2 | 8/2006 | Emslie et al. | |
| 7,097,560 B2 | 8/2006 | Okada | |
| 7,128,647 B2 | 10/2006 | Muir | |
| 7,159,865 B2 | 1/2007 | Okada | |
| 7,160,187 B2 | 1/2007 | Loose et al. | |
| 7,204,753 B2 | 4/2007 | Ozaki et al. | |
| 7,207,883 B2 | 4/2007 | Nozaki et al. | |
| 7,220,181 B2 | 5/2007 | Okada | |
| 7,252,288 B2 | 8/2007 | Seelig et al. | |
| 7,255,643 B2 | 8/2007 | Ozaki et al. | |
| 7,309,284 B2 | 12/2007 | Griswold et al. | |
| 7,322,884 B2 | 1/2008 | Emori et al. | |
| 7,329,181 B2 | 2/2008 | Hoshino et al. | |
| 2001/0013681 A1 | 8/2001 | Bruzzese et al. | |
| 2002/0015305 A1* | 2/2002 | Bornhorst et al. | 362/293 |
| 2002/0045472 A1 | 4/2002 | Adams | |
| 2002/0167637 A1* | 11/2002 | Burke et al. | 349/161 |
| 2002/0173354 A1 | 11/2002 | Winans et al. | |
| 2003/0027624 A1 | 2/2003 | Gilmore et al. | |
| 2003/0032478 A1 | 2/2003 | Takahama et al. | |
| 2003/0032479 A1 | 2/2003 | LeMay et al. | |
| 2003/0087690 A1 | 5/2003 | Loose et al. | |
| 2003/0128427 A1* | 7/2003 | Kalmanash et al. | 359/484 |
| 2003/0130028 A1 | 7/2003 | Aida et al. | |
| 2003/0176214 A1 | 9/2003 | Burak et al. | |
| 2003/0220134 A1 | 11/2003 | Walker et al. | |
| 2003/0236114 A1 | 12/2003 | Griswold et al. | |
| 2004/0023714 A1 | 2/2004 | Asdale | |
| 2004/0029636 A1 | 2/2004 | Wells | |
| 2004/0063490 A1 | 4/2004 | Okada | |
| 2004/0066475 A1 | 4/2004 | Searle | |
| 2004/0116178 A1 | 6/2004 | Okada | |
| 2004/0147303 A1 | 7/2004 | Imura et al. | |
| 2004/0150162 A1 | 8/2004 | Okada | |
| 2004/0162146 A1 | 8/2004 | Ooto | |
| 2004/0166925 A1 | 8/2004 | Emori et al. | |
| 2004/0171423 A1 | 9/2004 | Silva et al. | |
| 2004/0183972 A1 | 9/2004 | Bell | |
| 2004/0192430 A1 | 9/2004 | Burak et al. | |
| 2004/0198485 A1 | 10/2004 | Loose | |
| 2004/0207154 A1 | 10/2004 | Okada | |
| 2004/0209666 A1 | 10/2004 | Tashiro | |
| 2004/0209667 A1 | 10/2004 | Emori et al. | |
| 2004/0209668 A1 | 10/2004 | Okada | |
| 2004/0209671 A1 | 10/2004 | Okada | |
| 2004/0209678 A1 | 10/2004 | Okada | |
| 2004/0209683 A1 | 10/2004 | Okada | |
| 2004/0214635 A1 | 10/2004 | Okada | |
| 2004/0214637 A1 | 10/2004 | Nonaka | |
| 2004/0224747 A1 | 11/2004 | Okada | |
| 2004/0233663 A1 | 11/2004 | Emslie et al. | |
| 2004/0239582 A1 | 12/2004 | Seymour | |
| 2005/0032571 A1 | 2/2005 | Asonuma | |
| 2005/0037843 A1 | 2/2005 | Wells et al. | |
| 2005/0049032 A1 | 3/2005 | Kobayashi | |
| 2005/0049046 A1 | 3/2005 | Kobayashi | |
| 2005/0062410 A1 | 3/2005 | Bell et al. | |
| 2005/0063055 A1 | 3/2005 | Engel | |
| 2005/0079913 A1 | 4/2005 | Inamura | |
| 2005/0085292 A1 | 4/2005 | Inamura | |
| 2005/0145366 A1* | 7/2005 | Erel | 165/80.3 |
| 2005/0153772 A1 | 7/2005 | Griswold et al. | |
| 2005/0153775 A1 | 7/2005 | Griswold et al. | |
| 2005/0192090 A1 | 9/2005 | Muir et al. | |
| 2005/0206582 A1 | 9/2005 | Bell et al. | |
| 2005/0208994 A1 | 9/2005 | Berman | |
| 2005/0233799 A1 | 10/2005 | LeMay et al. | |
| 2005/0239539 A1 | 10/2005 | Inamura | |
| 2005/0266912 A1 | 12/2005 | Sekiguchi | |
| 2005/0285337 A1 | 12/2005 | Durham et al. | |
| 2006/0100014 A1 | 5/2006 | Griswold et al. | |
| 2006/0103951 A1 | 5/2006 | Bell et al. | |
| 2006/0125745 A1 | 6/2006 | Evanicky | |
| 2006/0166727 A1 | 7/2006 | Burak | |
| 2006/0191177 A1 | 8/2006 | Engel | |
| 2006/0284574 A1 | 12/2006 | Emslie et al. | |
| 2006/0290594 A1 | 12/2006 | Engel et al. | |
| 2007/0004510 A1 | 1/2007 | Underdahl et al. | |
| 2007/0004513 A1* | 1/2007 | Wells et al. | 463/31 |
| 2007/0010315 A1 | 1/2007 | Hein | |
| 2008/0020816 A1 | 1/2008 | Griswold et al. | |
| 2008/0020839 A1 | 1/2008 | Wells et al. | |
| 2008/0020840 A1 | 1/2008 | Wells et al. | |
| 2008/0020841 A1 | 1/2008 | Wells et al. | |

FOREIGN PATENT DOCUMENTS

| | | |
|---|---|---|
| EP | 0 997 857 | 10/1999 |
| EP | 1 260 928 | 11/2002 |
| EP | 1 282 088 | 2/2003 |
| EP | 1 462 152 A2 | 9/2004 |
| EP | 1 492 063 | 12/2004 |
| GB | 1 464 896 | 2/1977 |

(56) References Cited

FOREIGN PATENT DOCUMENTS

| | | |
|---|---|---|
| JP | 04-220276 | 8/1992 |
| JP | 06-043425 | 2/1994 |
| JP | 07-124290 | 5/1995 |
| JP | 2000-300729 | 10/2000 |
| JP | 00-350805 | 12/2000 |
| JP | 01-062032 | 3/2001 |
| JP | 01-238995 | 9/2001 |
| JP | 01-252393 | 9/2001 |
| JP | 01-252394 | 9/2001 |
| JP | 02-085624 | 3/2002 |
| JP | 2004-089707 | 3/2004 |
| JP | 2004-105616 | 4/2004 |
| JP | 04-166879 | 6/2004 |
| JP | 2005-253561 | 9/2005 |
| JP | 2005-266387 | 9/2005 |
| JP | 2005-266388 | 9/2005 |
| JP | 2005-274906 | 10/2005 |
| JP | 2005-274907 | 10/2005 |
| JP | 2005-283864 | 10/2005 |
| JP | 2006-059607 | 3/2006 |
| JP | 2006-346226 | 12/2006 |
| JP | 2002-200869 | 8/2007 |
| JP | 2007-200869 | 8/2007 |
| WO | 99/42889 | 8/1999 |
| WO | 99/44095 | 9/1999 |
| WO | 01/15127 | 3/2001 |
| WO | 01/15128 | 3/2001 |
| WO | 01/15132 | 3/2001 |
| WO | 01/09664 | 8/2001 |
| WO | 03/039699 | 5/2003 |
| WO | 04/001486 | 12/2003 |
| WO | 2004/102520 | 11/2004 |
| WO | 2006/034192 | 3/2006 |
| WO | 2006/038819 | 4/2006 |
| WO | WO 2007/040413 | 4/2007 |
| WO | WO 2009/054861 | 4/2009 |

OTHER PUBLICATIONS

U.S. Appl. No. 11/167,655, filed Jun. 27, 2005 (con't of U.S. Appl. No. 10/213,626 BellBoyd case).
EP Office Action dated Sep. 13, 2007 from Application No. 05 705 315.9.
Final Office Action dated Apr. 23, 2008 for U.S. Appl. No. 10/755,598.
Office Action dated May 24, 2007 from U.S. Appl. No. 11/167,655 BellBoyd case.
Office Action dated Jan. 3, 2008 from U.S. Appl. No. 11/167,655 BellBoyd case.
PCT Search Report and Written Opinion for PCT/US2007/077437, mailed Apr. 9, 2008.
PCT Search Report and Written Opinion for PCT/US2007/084458, mailed on May 20, 2008.
PCT Search Report and Written Opinion for PCT/US2007/084421, mailed on May 20, 2008.
PCT Search Report and Written Opinion for PCT/US2007/084333, mailed on Jul. 16, 2008.
Office Action mailed Oct. 31, 2008 for U.S. Appl. No. 11/829,917.
Office Action mailed Oct. 31, 2008 for U.S. Appl. No. 11/829,849.
Office Action mailed Nov. 14, 2008 for U.S. Appl. No. 11/829,853.
"Debut of the Let's Make a Deal Slot Machine," Let's Make a Deal 1999-2002, http:///www.letsmakeadeal.com/pr01.htm. Printed Dec. 3, 2002 (2 pages).
"Light Valve". [online] [retrieved on Nov. 15, 2005]. Retrieved from the Internet URL http://www.meko.co.uk/lightvalve.shtml (1 page).
"Liquid Crystal Display". [online]. [retrieved on Nov. 16, 2005]. Retrieved form the Internet URL http://en.wikipedia.org/wiki/LCD (6 pages).
"SPD," Malvino Inc., www.malvino.com, Jul. 19, 1999, 10 pages.
"What is SPD?" SPD Systems, Inc. 2002, http://www.spd-systems.com/spdq.htm. Printed Dec. 4, 2002 (2 pages).
Bonsor, Kevin, "How Smart Windows Will Work," Howstuffworks, Inc. 1998-2002, http://www/howstuffworks.com/smart-window.htm/printable. Printed Nov. 25, 2002 (5 pages).
Bosner, "How Smart Windows Work," HowStuffWorks, Inc.,www.howstuffworks.com, 1998-2004, 9 pages.
International Exam Report dated Sep. 21, 2007 in European Application No. 05 705 315.9.
International Search Report, 5 page document, International Application No. PCT/US2005/000950, Dated Jun. 2, 2005.
Living in a flat world? Advertisement written by Deep Video Imaging Ltd., published 2000.
Novel 3-D Video Display Technology Developed, News release: Aug. 30, 1996, www.eurekalert.org/summaries/1199.html, printed from Internet Archive using date Sep. 2, 2000.
Saxe et al., "Suspended-Particle Devices," www.refr-spd.com, Apr./May 1996, 5 pages.
Time Multiplexed Optical Shutter (TMOS): A revolutionary Flat Screen Display Technology, www.vea.com/TMOS.html, Apr. 8, 1999, printed from Internet Archive using date Oct. 6, 1999.
Time Multiplexed Optical Shutter (TMOS): A revolutionary Flat Screen Display Technology, www.tralas.com/TMOS.html, Apr. 5, 2001, printed from Internet Archive using date Apr. 11, 2001.
U.S. Appl. No. 11/849,119, filed Aug. 31, 2007.
U.S. Appl. No. 11/858,695, filed Sep. 20, 2007.
U.S. Appl. No. 11/858,845, filed Sep. 20, 2007.
U.S. Appl. No. 11/858,849, filed Sep. 20, 2007.
U.S. Appl. No. 11/859,127, filed Sep. 21, 2007.
U.S. Appl. No. 11/938,184, filed Nov. 9, 2007.
Written Opinion of the International Searching Authority dated May 25, 2005, for PCT Application No. PCT/US2005/000597.
Written Opinion of the International Searching Authority, 7 page document, International Application No. PCT/US2005/000950, Dated Jun. 2, 2005.
U.S. Appl. No. 11/938,086, filed Nov. 9, 2007.
U.S. Appl. No. 11/938,151, filed Nov. 9, 2007.
Office Action dated Aug. 29, 2007 from U.S. Appl. No. 10/755,598.
Office Action dated Oct. 31, 2007 from U.S. Appl. No. 10/213,626.
Final Office Action dated Mar. 28, 2007 from U.S. Appl. No. 10/213,626.
Office Action dated Apr. 27, 2006 from U.S. Appl. No. 10/213,626.
Final Office Action dated Jan. 10, 2006 from U.S. Appl. No. 10/213,626.
Office Action dated Aug. 31, 2004 from U.S. Appl. No. 10/213,626.
European Office Action dated Sep. 13, 2007 in Application No. 05 705 315.9.
PCT Written Opinion dated Jul. 16, 2008 issued in PCT/US2007/084333 (WO2009/054861).
PCT International Preliminary Report on Patentability and Written Opinion dated Apr. 27, 2010 issued in PCT/US2007/084333 (WO 2009/054861).

* cited by examiner

SEPARABLE BACKLIGHTING SYSTEM

TECHNICAL FIELD

The present disclosure relates generally to lighting systems for displays. In particular, the present disclosure relates generally to back lighting systems for displays that require a source of high intensity illumination.

BACKGROUND

Liquid crystal displays (LCDs) require a source of high intensity illumination for the images generated on the LCD display panel to be visible to an observer. The panels are customarily illuminated from the sides or from behind the panel, and the panel and illumination system are integrated and embedded together within a single sealed enclosure. This provides a fully functional display system which is suitable for both industrial and consumer use in a wide variety of applications. This is also beneficial as LCDs are being made thinner to use up less real estate.

Multi-Layered display (MLD) systems which employ more than one LCD panel require considerably more illumination than do single panels, due to the limited transmissivity of LCD panels. While a single panel will permit approximately 10% of the incident illumination to reach the observer, use of two panels effectively in series will reduce the transmitted illumination to only 1% ($0.10 \times 0.10 = 0.01 = 1\%$). As a result, considerably more illumination is required to achieve satisfactory results. Such lighting dramatically increases the heat generated by both the lighting devices and their supporting electronics and necessitates the use of extreme cooling measures to reduce the temperature of the MLD unit. The performance of the backlighting system has been identified as one of the most critical aspects of MLD design and implementation.

OVERVIEW

The invention provides for a back lighting system for displays that require a source of high intensity illumination. The invention provides for an optical module and a lighting module to be separate but complementary structural modules. In one embodiment, a gaming machine may have a cabinet defining a first interior region of the gaming machine, the cabinet adapted to house a plurality of gaming machine components. The gaming machine may have an optical module positioned within or about the first interior region having a first display device configured to output a visual image in response to a control signal and including one or more controllably transparent portions and a second display device, arranged relative to the first display device such that a common line of sight passes through a portion of the first display device to a portion of the second display device and a lighting module positioned within or about the first interior region having an enclosure defining a second interior region, the enclosure having a light film defining a first surface, a plate defining a second surface, a plurality of light sources positioned between the light film and plate to provide light to the optical module, and a cooling component adapted to flow a cooling medium within the lighting module to transfer heat generated from the plurality of light sources, wherein the lighting module is removably coupled to the optical module such that the lighting module may be replaced or serviced without disturbing the optical module.

In another embodiment, the gaming machine may have a cabinet defining a first interior region of the gaming machine, the cabinet adapted to house a plurality of gaming machine components. An optical module may be positioned within or about the first interior region, the optical module having a first display device configured to output a visual image in response to at least one control signal and a lighting module may be positioned within or about the first interior region, having a light film, a plate, a plurality of light sources positioned between the light film and plate, and at least one conduit positioned between the plurality of light sources and plate, the conduit designed to receive a cooling medium to transfer heat generated from the plurality of light sources, wherein the lighting module is removably coupled to the optical module such that the lighting module may be replaced or serviced without disturbing the optical module.

In yet another embodiment, a method for displaying a game of chance on a gaming machine may comprise outputting a first visual image to play a game of chance on a first display device in response to a control signal from a logic device, the first visual image including one or more controllably transparent portions, outputting a second visual image to play the game of chance on a second display device such that a common line of sight passes through a transparent portion of the first display device to a portion of the second display device, the first and second display devices forming an optical module, emitting light from a lighting module to the optical module to view the first and second visual images, the lighting module having a plurality of light sources, flowing a cooling medium through the lighting module to transfer the heat generated from the plurality of light sources, and servicing the lighting module without disturbing the optical module.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DETAILED DESCRIPTION

Figure 1A:
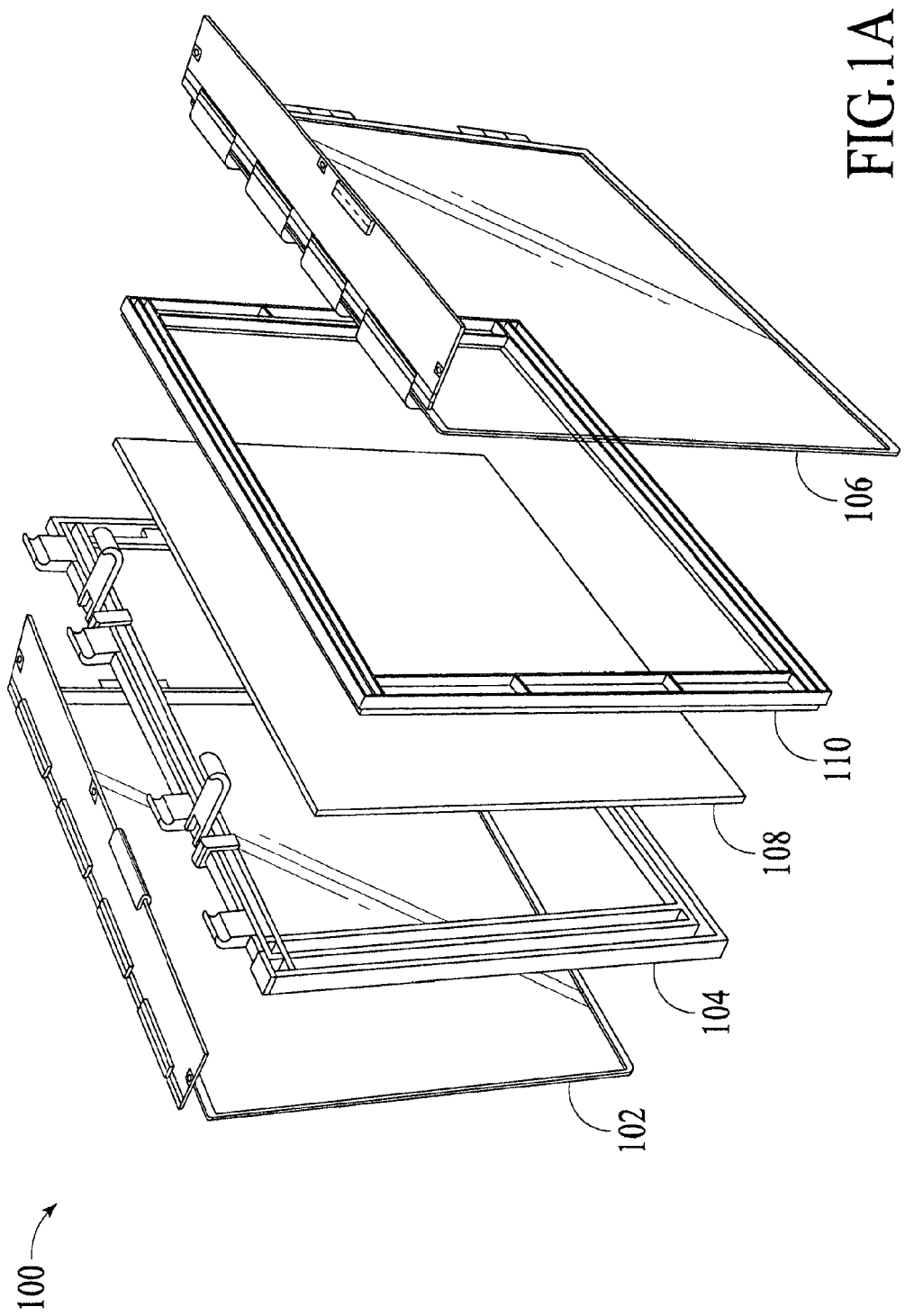
FIGS. 1A-1C illustrate in exploded perspective view, various components of a separable backlighting system according to one embodiment of the present invention.

Embodiments are described herein in the context of a separable backlighting system for a display unit that requires a high intensity illumination source. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In this application, numerous specific details are set forth in order to provide a thorough understanding of the present invention. However, the present invention may be practiced without some or all of these specific details. In other instances, well known process steps have not been described in detail in order not to obscure the present invention.

Reference will now be made in detail to some specific examples for carrying out the invention. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

The steps of the methods shown and described herein are not necessarily all performed (and in some implementations are not performed) in the order indicated. Moreover, some implementations of the methods discussed herein may include more or fewer steps than those shown or described.

Furthermore, the techniques and mechanisms will sometimes describe and/or illustrate a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, an indicated connection does not necessarily mean a direct, unimpeded connection unless otherwise noted. Moreover, there may be other connections between entities than are indicated herein, e.g., in network diagrams.

The present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Currently, one method to cool MLD systems is with fans that blow external air into an associated cabinet and the MLD system. However, dirt and dust from the external air builds up on the lighting devices and LCD panels thereby causing the MLD system to lose intensity, fail prematurely, and require frequent servicing and maintenance. Since the lighting device is integral with the LCD panels, which allows for a thinner and compact display device, the entire device must be disassembled in order the replace, repair, service, or maintain any component of the MLD system. This results in down time for an associated device, which results in a loss of money to the device user.

The invention provides for an optical module and a lighting module to be separate but complementary structural modules. As further discussed below with reference to FIG. 1A, the optical module may include at least one optical film and at least one display, such as a liquid crystal display (LCD), or an MLD with a plurality of displays. As further discussed below with reference to FIGS. 1B and 1C, the lighting module may include a light diffuser, heat shield, a plurality of light sources, and a cooling component having heat sinks, fans, and any other components.

Contrary to current display devices, this may result in an increase in the thickness of the display device, but does provide for the ease and lower cost of replacing and/or maintaining the components of an MLD device without having to disassemble and/or replace the entire device. Additionally, having separate optical and lightning modules may decrease the down time of an associated device since either module may be easily replaced with a working module. For example, should the lighting source decrease in intensity, the lighting module may be replaced without having to remove the LCD panels and any other connected components, including a touch screen that may be affixed to the surface of the LCD panel.

Figure 1B:
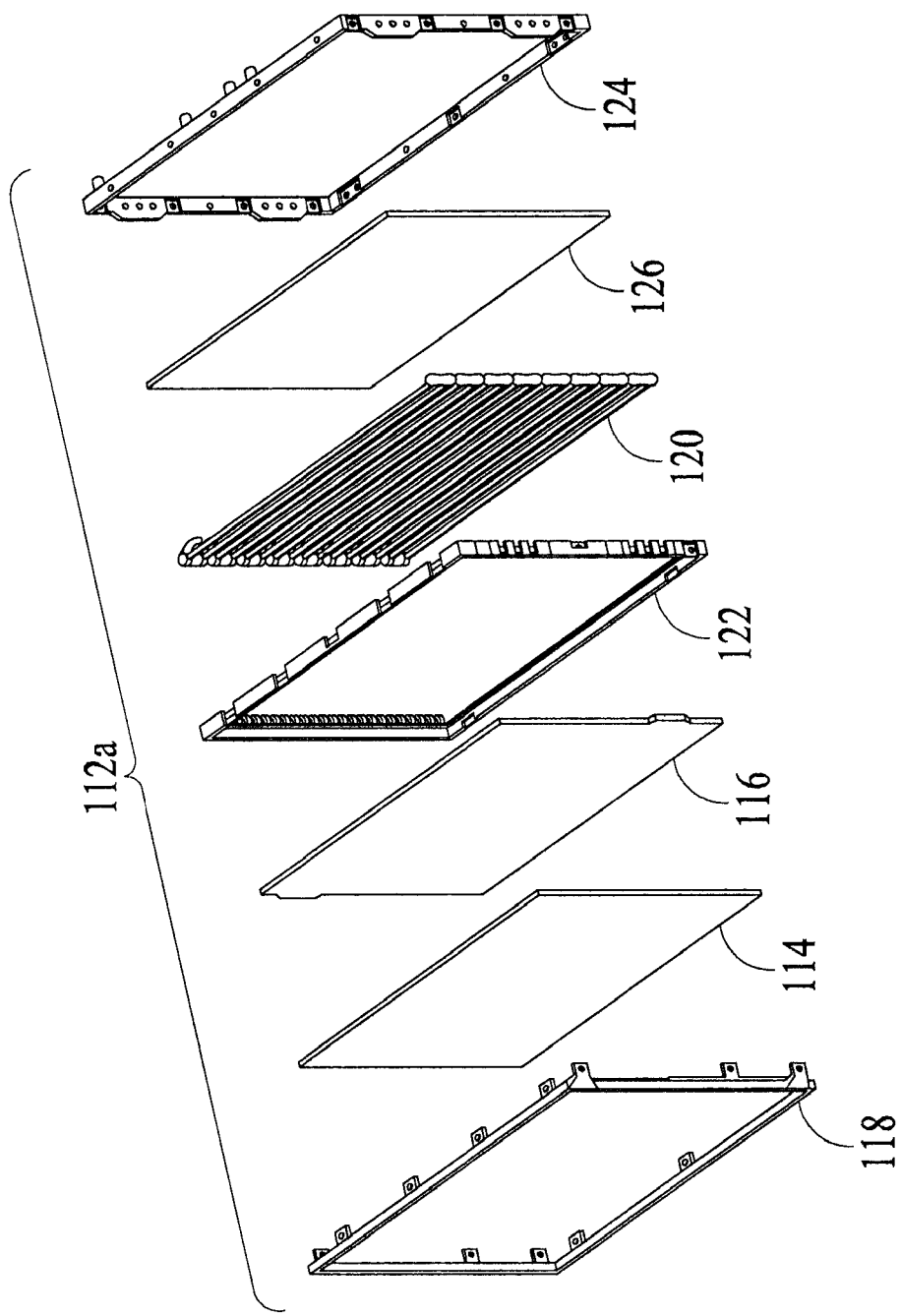
Figure 1B:
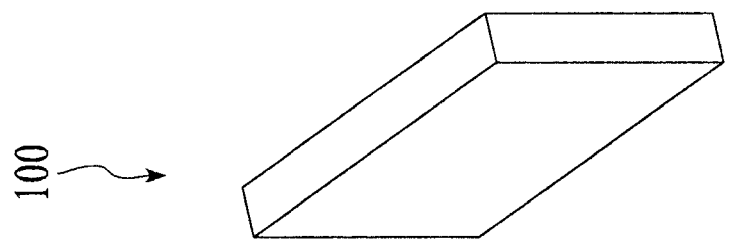
Figure 1C:
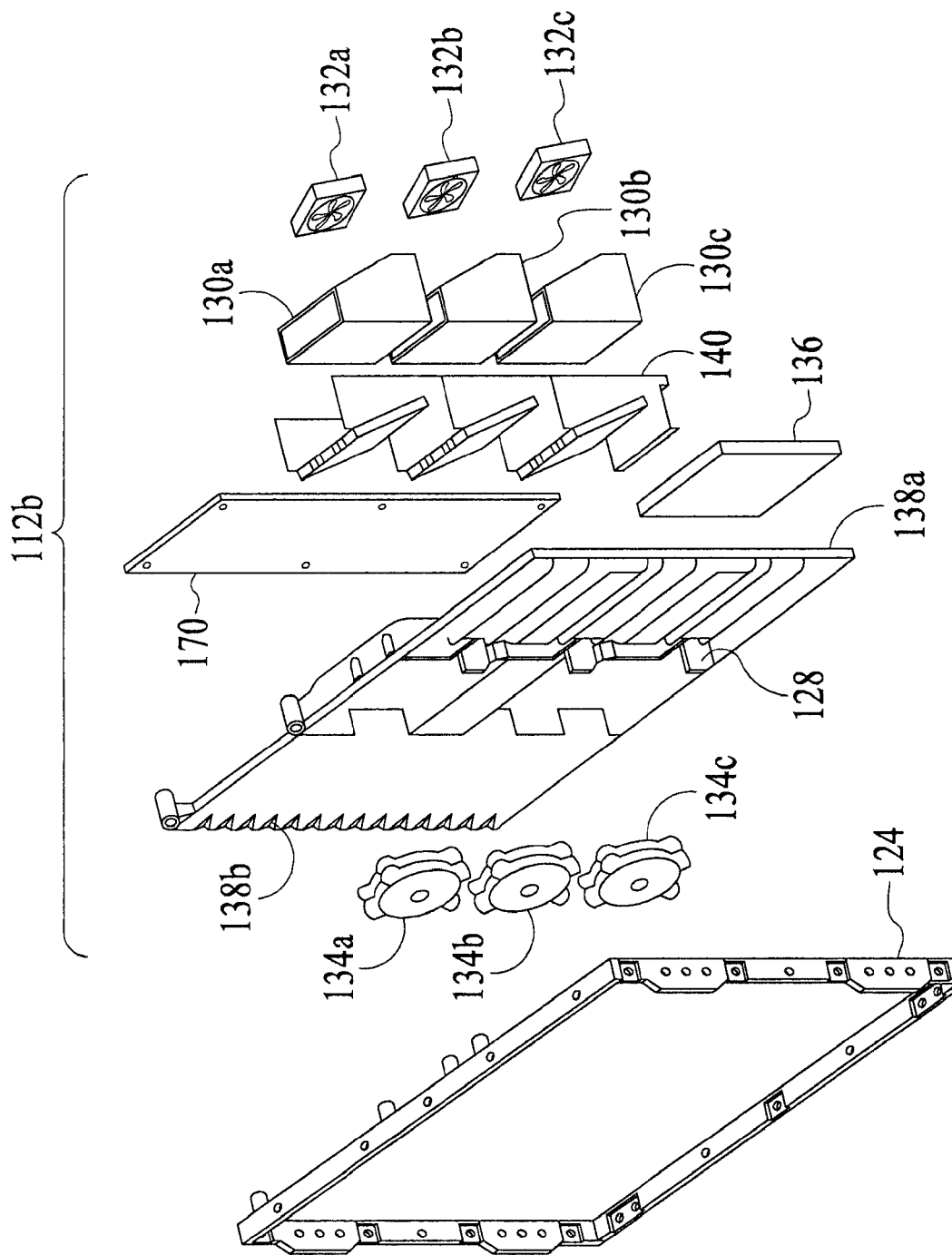
Figure 1D:
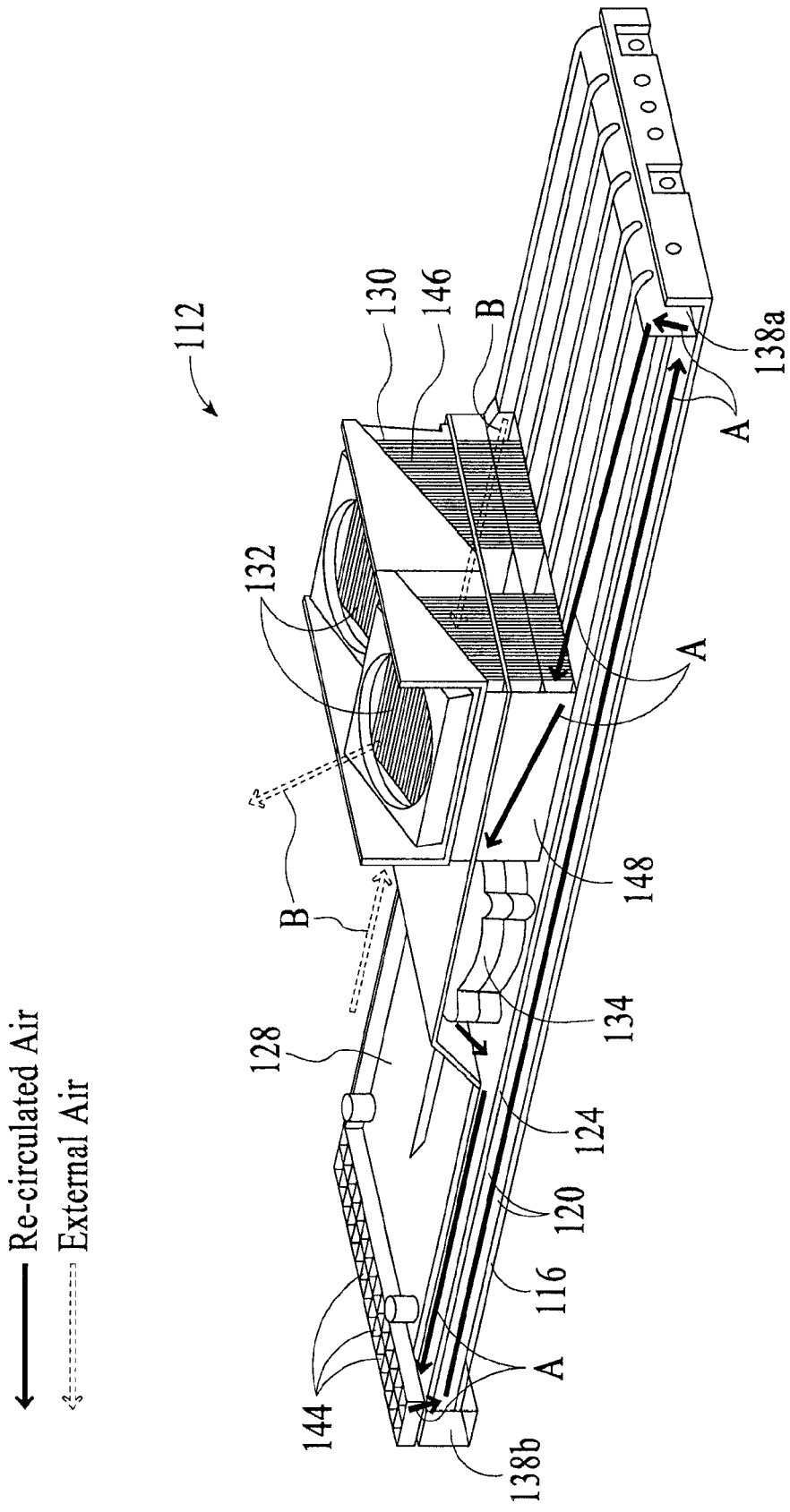
FIG. 1D is a perspective view of an exemplary flow diagram of a cooling medium through the lighting module of FIGS. 1B and 1C.
Figure 1E:
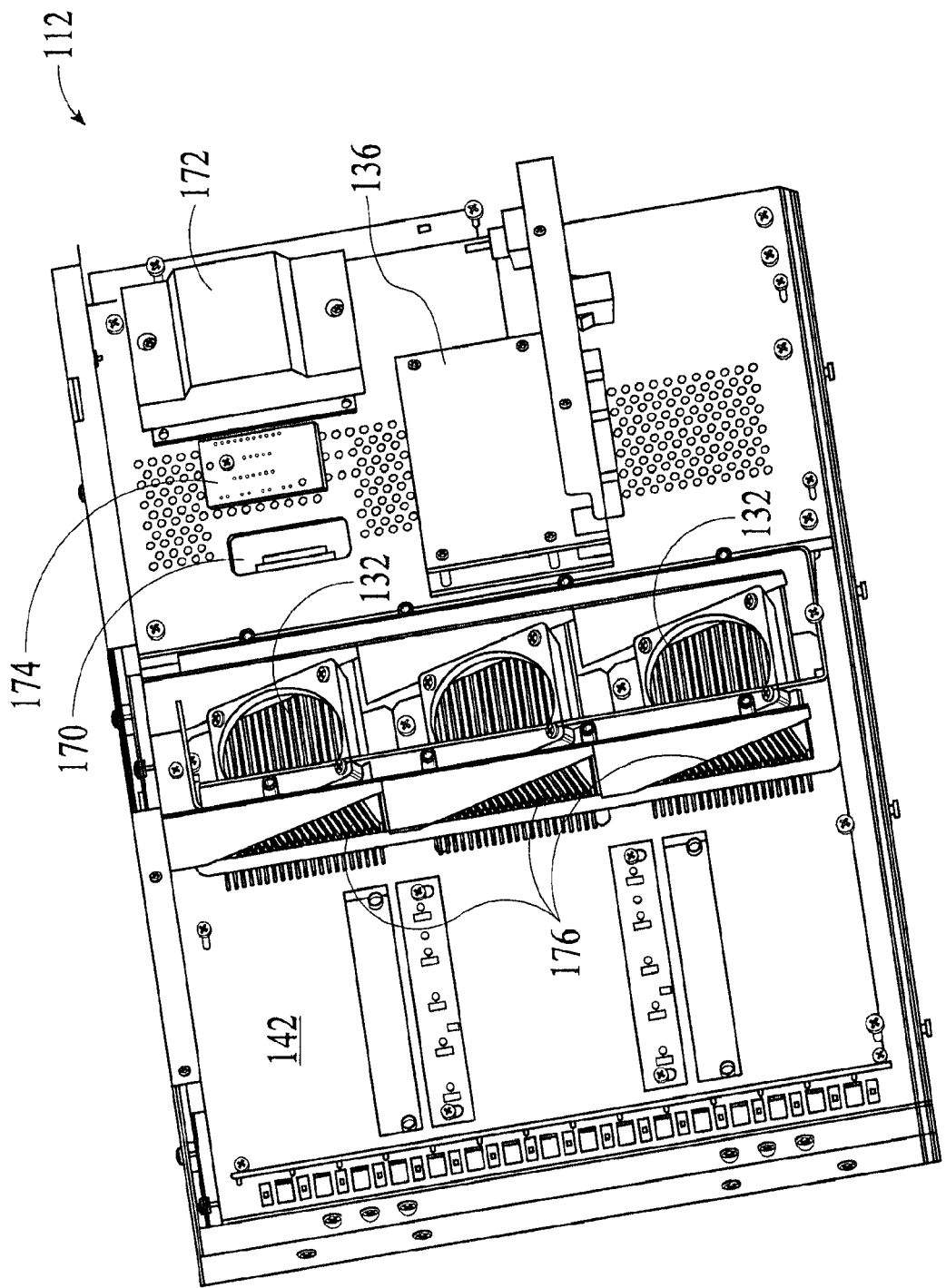
FIG. 1E is a back perspective view of the separable backlighting system of FIGS. 1A-1D.
Figure 1F:
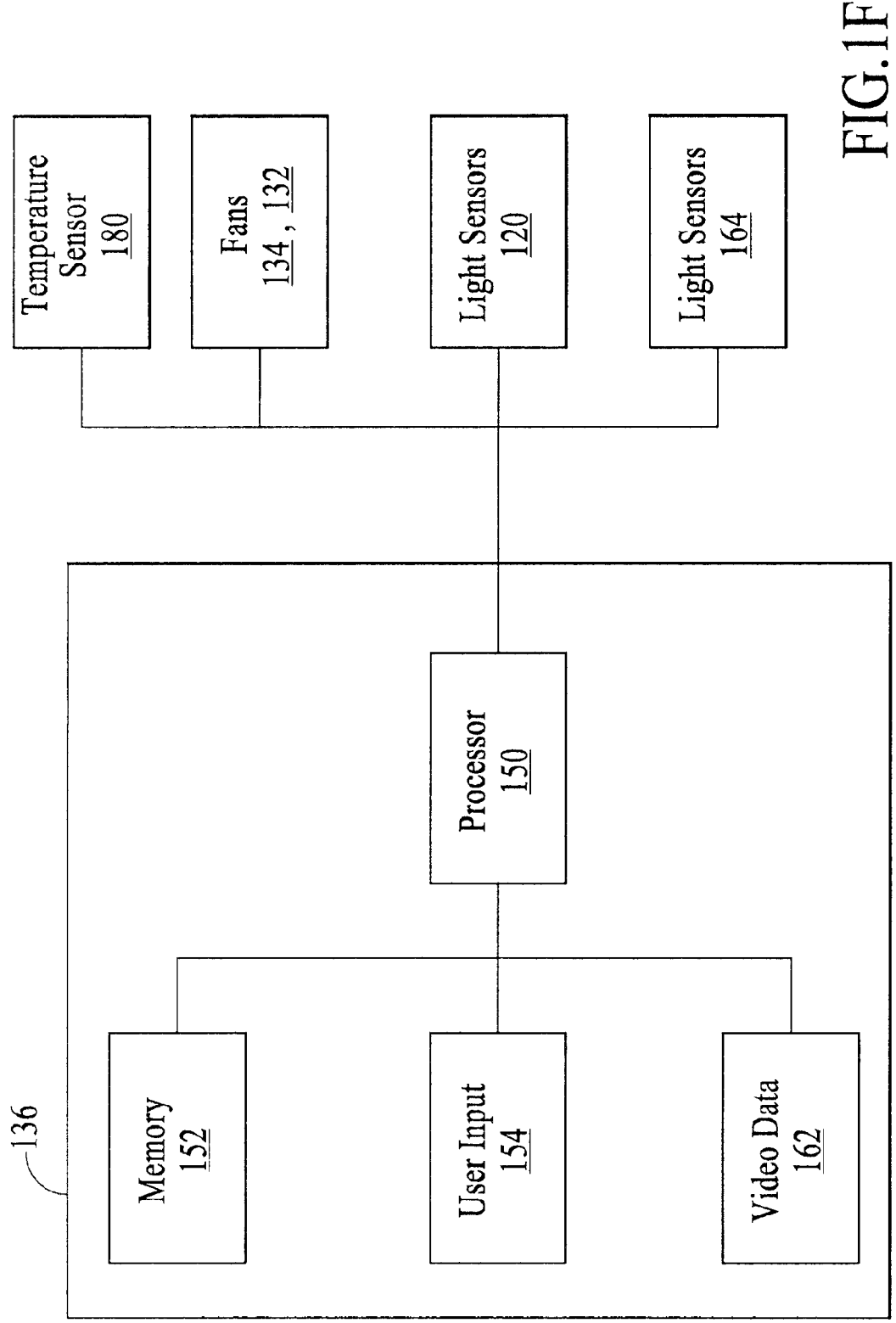
FIG. 1F is a block diagram of an exemplary logic device of the separable backlighting system of FIGS. 1A-1E.

FIGS. 1A-1C illustrate in exploded perspective view of various components of a separable backlighting system according to one embodiment of the present invention. FIG. 1D is a perspective view of an exemplary flow diagram of a cooling medium through the lighting module of FIGS. 1B and 1D. FIG. 1E is a back elevation view of the separable backlighting system of FIGS. 1A-1D. FIG. 1F is a block diagram of an exemplary logic device of the separable backlighting system of FIGS. 1A-1C. Although illustrated with the use of an MLD, the invention may be used with other non-MLD systems. Exemplary uses of the MLD system are described in detail with reference to FIGS. 4A, 4B, and 5B. FIG. 1A illustrates an exploded perspective view of the optical module. The optical module 100 may have a first display device 102 supported by a display frame 104. The display frame 104 may be made from any rigid material such as metal, aluminum, plastic, or the like. A second display device 106 may be arranged relative to the first display device 102 such that a common line of sight passes through a portion of the first display 102 device to a portion of the second display device 106. In use, the first display device 102 and the second display device 106 may be configured to output a visual image in response to one or more control signals transmitted from a logic device as further described in detail below. Although illustrated with only two display devices, the number is not intended to be limiting as any number of display devices may be used as illustrated in FIG. 4B. Furthermore, the display devices may be LCD panels or any other display device able to receive and transmit visual images. The display devices 102, 106 may present video and/or still images.

The optical module 100 may have an interstitial component or optical film 108 supported by an interstitial frame 110. The optical film 108 may be disposed between the first display device 102 and the second display device 106. The optical film 110 may be used to remove moiré interferences and more evenly distributes the incident light across its surface area to eliminate variations in intensity. Although illustrated with one optical film, any number of optical films may be used as desired. For example, an optical film may be provided behind the second display device 106.

The optical films may be made from transparent plastic material that may be selected from one of the following materials: polycarbonate (PC), poly-methyl methacrylate/styrene copolymer (MS), cyclic olefins copolymer (COC), poly(ethylene terephthalate) glycol (PETG) and polymeric methyl methacrylate (PMMA), polystyrene (PS).

FIGS. 1B and 1C illustrate an exploded perspective view of the lighting module. Referring now to FIG. 1B, a front portion of the lighting module 112a may have a light diffuser 114 and heat shield 116, both of which may be supported by brackets 118 and 122. Light diffuser 114 and heat shield 116 can generally be referred to as "light films," with such light films being generally transparent or translucent, and also adapted to direct light from the lighting module 112a to the optical module 100. Although described only with a light diffuser 114 and heat shield 116, the lighting module 112a may have other light films as desired by the user, such as a brightness enhancement film to direct light in a specific direction, a dual brightness enhancement film to recapture any reflected light and direct it in a specific direction, or the like.

The lighting module 112a may also have a plurality of light sources 120 supported by bracket 122 and plate 124. The lighting module 112a may also have a light reflector 126 positioned between the plurality of light sources 120 and plate 124. In one embodiment, light reflector 126 may not be necessary as reflective material may be disposed directly on a surface of plate 124.

Light diffuser 114 and reflector 126 may be designed to direct the light generated by the plurality of light sources 120 toward the optical module 100. It will be understood that optical module 100 is shown only for reference and does not form part of the lighting module 112a. Heat shield 116 may be designed to absorb heat generated from the plurality of light sources 120 so that heat is not directed toward the optical module. This prevents the break down and/or warping of the display devices 102, 106 or optical film 108. Light diffuser 114 may be made of a transparent substrate having a relative refractive index such that it can refract and diffuse the light. The transparent substrate may be made of material such as polycarbonate, acrylate, or the like. Heat shield 116 may be made a transparent material having a low thermal conductivity such as certain kinds of plastic, glass, and the like. Light reflector 126 may be fabricated from a material with a high coefficient of reflection which causes most of the light emitted from the plurality of light sources 120 in the direction away from the optical module 100 to be redirected toward the optical module 100.

The heat shield 116 may be positioned near a first surface of the plurality of light sources 120. The plurality of light sources 120 may be cold cathode fluorescent lamps (CCFLs). However, the plurality of light sources 120 may be any other type or configuration of light or illumination source able to illuminate a reflective or transmissive light, such as arrays of light emitting diodes (LEDs), incandescent lamps, and the like. The plurality of light sources 120 may be designed to emit a desired brightness, and may have a plurality of redundant light sources.

In one embodiment, the redundant light sources may continuously emit light such that the display may be brightly illuminated. When one of the plurality of light sources breaks down, the display may still be brightly illuminated, although a bit dimmer, due to the use of redundant light sources. For example, if ten CCFLs are needed for a given application to have enough light, then 15 CCFLs may be installed and turned on. In this manor, several of the "redundant light sources" may fail and the display will still be operational.

In another embodiment, the redundant light sources may be turned off. However, as further discussed below, the redundant light source may be turned on to emit light when desired by a user or when a processor detects one of the plurality of light sources no longer emits light. In yet another embodiment, some of the redundant light sources may be turned on while others are turned off.

Brackets 118, 122 may surround the outer edges of the plurality of light sources 120 to provide support for the plurality of light sources 120. Plate 124 may be disposed on a second surface of the plurality of light sources 120 to provide the necessary rigidity and support for lighting module 112a. Plate 124 may also act as a heat transfer medium to absorb heat generated by the light sources 120 and may be made from any rigid material, such as aluminum. Plate 124 may be removably coupled to brackets 118, 122 to form an enclosure around the plurality of light sources 120 and to seal the plurality of light sources 120 in a sealed enclosure.

As stated above, the light sources 120 may generate a lot of heat. Additionally, other electronic components, such as ballasts, transformers, and other devices necessary to supply the light sources with the electrical energy required to generate illumination, may generate additional heat. Therefore, heat dissipation is an important aspect of the display device. Referring now to FIG. 1C, a further portion of lighting module 112b may have a cooling component having a plenum 128 disposed near the plate 124 and a first plurality of fans 134a, 134b, 134c positioned between the plate 124 and the plenum 128. A plurality of heat sinks or heat exchangers 130a, 130b, 130c may be coupled to the plenum via heat exchange bracket 140. A second plurality of fans 132a, 132b, 132c may be coupled to each of the plurality of heat exchangers 130a-c. In one embodiment, the "lighting module" may contain both 112a and 112b. However, in another embodiment, 112a may be a separate module from 112b.

Plenum 128, heat exchangers 130a-c, heat exchange bracket 140 and fans 132, 134 may be made of any material able to withstand and conduct heat such as aluminum or an aluminum alloy, a polycarbonate material, or any other suitable material. The components may be coupled to each other via any known means, such as screws, bolts, snap fit, and the like.

The plenum 128 and the first plurality of fans 134a-c may be designed to circulate air flow in the lighting module 112a (FIG. 1B) to dissipate and transfer the heat generated from the plurality of light sources 120. Heat exchangers 130a-c and the second plurality of fans 132a-c may be designed to circulate an air source through heat exchanger 130 to absorb and transfer heat from the heated circulated air. Referring now to FIG. 1D, a perspective view of an exemplary flow of a cooling medium through the lighting module is shown. In one embodiment, a captive or re-circulated fluid, such as air, may be used to cool the lighting module 112. The flow of the re-circulated fluid is illustrated with reference to arrows A. External air flow is illustrated with reference to arrows B. In use, the first plurality of fans 134 may blow re-circulated air through channels 144 on a side 138b of plenum 128 to the surface of the plurality of light sources 120 positioned between plate 124 and heat shield 116. The circulated air may flow across a surface of the plurality of light sources 120 and absorb and transfer the heat. The heated air may be directed to flow through channels (not shown) on side 138a of plenum 128 to the bottom portion 148 of heat exchanger 130. Fans 132 may direct external air in the direction of arrows B, through a plurality of fins 176 (FIG. 1E) on top portion 146 of heat exchanger 130, whereby the external air absorbs and transfers the heat from the heated re-circulated air out of the lighting module 112. Thus, the re-circulated air may be cooled by the external air when blown through the heat exchanger 130, before returning to the plurality of light sources 120. Using re-circulated air to cool the plurality of light sources 120 prevents any dirt, dust or any other contaminates from contacting and building up on the plurality of light sources 120.

In another example, the cooling medium may be re-circulated throughout the lighting module 112 using at least one conduit or fluid passageway. As the term is used herein, a conduit refers to a channel, tube, routing port, pipe, or the like that permits or communicates a fluid (a gas, liquid, or combination thereof) between two locations. The plenum 128 may be designed to house a plurality of conduits interconnected with the first plurality of fans 134 and heat exchangers 130 to re-circulate the cooling medium therethrough. In another embodiment, conduits may be positioned near or on the surface of the plurality of light sources 120 between the plurality of light sources 120 and plate 124, where the cooling medium may absorb and transfer the heat generated by the plurality of light sources 120. As the cooling medium flows through the plenum 128 and/or conduits, it may absorb and transfer the heat generated from the plurality of light sources 120. The cooling medium may then be flowed through the conduit to a bottom portion 148 of the heat exchangers 130*a-c*. Fans 132*a-c* may blow an air source, such as ambient air, into a top portion 146 of the heat sinks 130*a-c* to absorb and transfer the heat from the heated cooling medium as the heated cooling medium is flowed through the conduits in the heat exchanger 130*a-c*. The cooled cooling medium may then be recirculated from the heat exchangers 130*a-c* to the plenum 128 to absorb additional heat generated from the lighting sources.

The cooling medium may be any gas, fluid or liquid, or any other material that is able to absorb heat, such as anti-freeze. In one embodiment, air may be used as a cooling medium in the conduit. In other embodiments, the cooling medium may be external ambient air.

FIG. 1E is a back perspective view of the separable backlighting system of FIGS. 1A-1D. The lighting module may have a back casing 142 to enclose the lighting module 112 in a housing. The lighting module 112 may have a power inverter board 170. Power inverter board 170 may provide the necessary voltage to run the plurality of light sources 120.

The lighting module 112 may also have a logic device 136. Logic device 136 may be any programmable logic device, processor, video card, or the like. FIG. 1F is a block diagram of an exemplary logic device of the separable backlighting system of FIGS. 1A-1E. Although illustrated with specific components, the components are not intended to be limiting as the logic device 136 may have other components as desired by the user. Logic device 136 may have a processor 150 having a memory 152 to store any desired data such as a desired brightness of the lighting module 112 and video data 162 to store any video data. The memory may be any type of known memory such as random access memory (RAM), non-volatile random access memory (NVRAM), or the like. The processor 150 may be coupled to a user input 154 to receive signals from a user. The user input 154 may be any type of known input such as a keyboard, touch screen, mouse, or the like. Processor 150 may control the fans 132, 134, light sources 120, redundant light sources, and any other devices desired by the user. Processor 150 may also be in communication with any other devices, such as the master gaming controller, as further discussed below.

As briefly discussed above, logic device 136 may detect when one of the light sources 120 no longer emits light. In one embodiment, logic device 136 may communicate with a plurality of light sensors 164 coupled to the plurality of light sources 120, which may include a plurality of redundant light sources. The plurality of light sensors 164 may be any known light sensors. The light sensors 164 may communicate with processor 150 to inform the processor 150 when any of the light sources 120 no longer emit light. Any other known methods may be used to determine whether the light source is emitting light or not.

Should a user desire the display to be brighter or should one of the light sources no longer emit light, logic device 136 may transmit a signal to any redundant light source to turn on and emit light. In another example, a user may want less light output from the lighting module 112. Logic device may signal one of the light sources 120 to turn off and not emit light.

Logic device 136 may also control the speed of the fans 132, 134, thereby controlling the speed of the air flow through lighting module 112. In one embodiment, lighting module 112 may have at least one temperature sensor 180 in communication with logic device 136 to detect the temperature of the lighting module 112. When the temperature sensor 180 detects an overheating of the lighting module 112, logic device 136 may increase the speed of the fans 132, 134 to increase the air flow through the lighting module 112. Additionally or alternatively, logic device 136 may turn off any or all of the plurality of light sources 120. This prevents warping or premature failure of the optical module 100. When the temperature sensor 180 detects a temperature within a normal operating range, logic device 136 may turn on all or any of the plurality of light sources 120 and/or reduce the speed of the fans 132, 134.

Lighting module 112 may have any other logic devices desired by the user such as a touchscreen controller 172, power distribution board 174, on screen display board, or the like. Additionally, although illustrated positioned in specific locations, the locations are not intended to be limiting as the devices may be coupled to the lighting module 112 in any configuration.

Although the lighting module 112 is illustrated as a back lighting module coupled to the back of the optical module 100, the location of the lighting module is not intended to be limiting, as the module may be located on the sides, top, or any other location or configuration desired by the user.

Figure 2A:
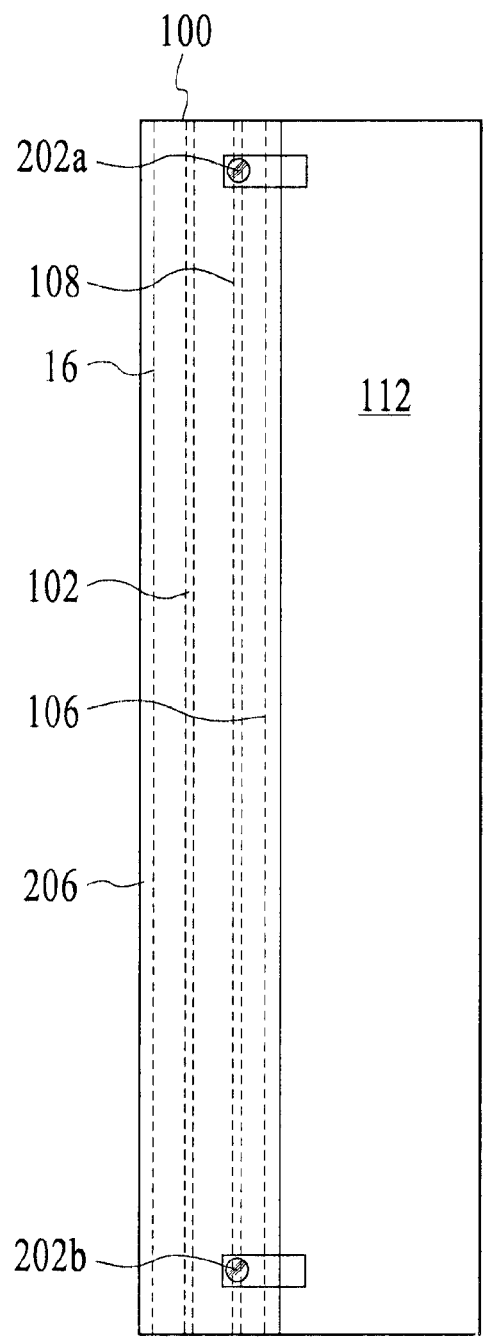
FIGS. 2A and 2B illustrate right and left side views of the separable backlighting system of FIGS. 1A-1C.
Figure 2B:
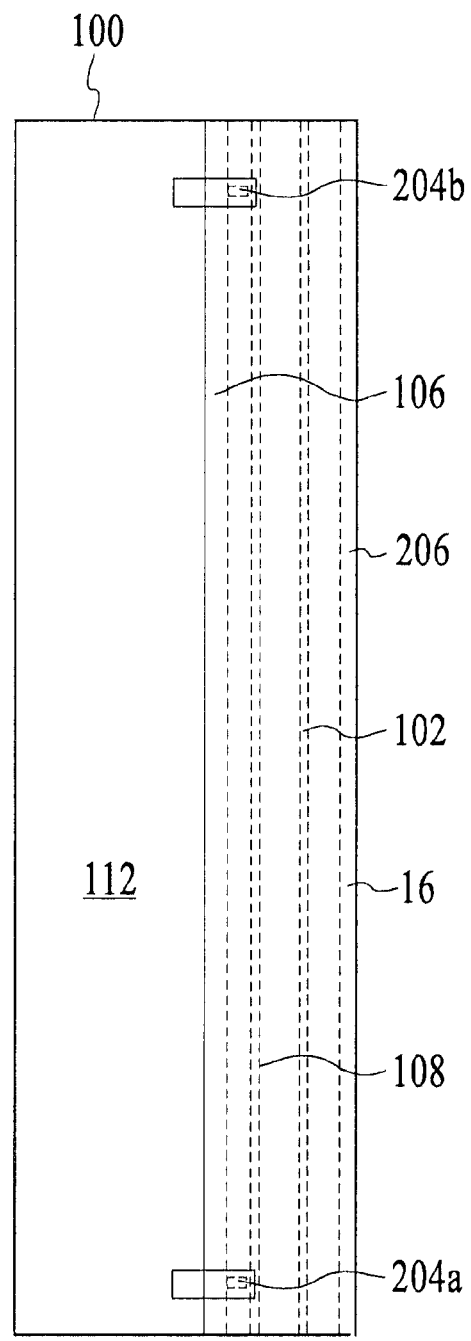

FIGS. 2A and 2B illustrate right and left side views of the separable backlighting system of FIGS. 1A-1C, respectively. Optical module 100 may be a separate enclosed structure having a touch screen 16, first display device 102, optical film 108, and second display device 106. Touch screen 16 is discussed in detail below with reference to FIGS. 4A and 4B. Lighting module 112 may also be a separate enclosed structure that may be removably coupled to the back surface of optical module 100 through any known means. As illustrated in FIG. 2A, in one example, lighting module 112 may be removably coupled to optical module 100 via a plurality of mating members 202*a*, 202*b*, such as screws, bolts, tabs, or other removable fastening means. In another example illustrated in FIG. 2B, the optical module 100 may be removably coupled to lighting module 112 through tabs 204*a*, 204*b* that snap into a recess (not shown) of the optical module 100. It will now be realized that any other means to removably couple the optical and lighting modules together may be used, such as a key, latch, clip, and the like.

Separating the display devices and light source into separate but complementary structural modules allows each module to be hermetically sealed to prevent dust, dirt, and other contamination from being deposited on the display devices or lighting sources. As stated above, MLD systems are currently cooled by flowing external air across the light sources and LCD panels. This results in dirt and contamination collecting on the MLD system. Thus, by separating the optical module, the optical module may have a longer life and may not require any other maintenance other than replacement upon component failure.

Moreover, having the lighting module 112 separate from the optical module 100 allows a user to easily service, maintain, or replace the light sources as the illumination of the light sources decreases over time due to component deterioration (as with fluorescent light sources) or failure (as with incandescent light sources) while preserving the optical module 100. The optical module 100 will not be disturbed thereby preventing any dust or contaminate from entering the LCD panels to prevent premature failure. Furthermore, additional cooling techniques may be used which are not practical for integrated display systems, such as refrigerant-based systems using conduits as discussed above. Additionally, light sources other than fluorescent lights, such as short-lived incandescent lights, any other light sources not compatible with traditional display enclosures, or less expensive light sources, may be used. Thus, the ability to physically separate the optical module 100 from the lighting module 112 allows for independent access to either module and its components while preserving the other module. This also allows a user the ability to customize the lighting module to specific specification such as a desired intensity, specific light source, or a specific light configuration.

Figure 3:
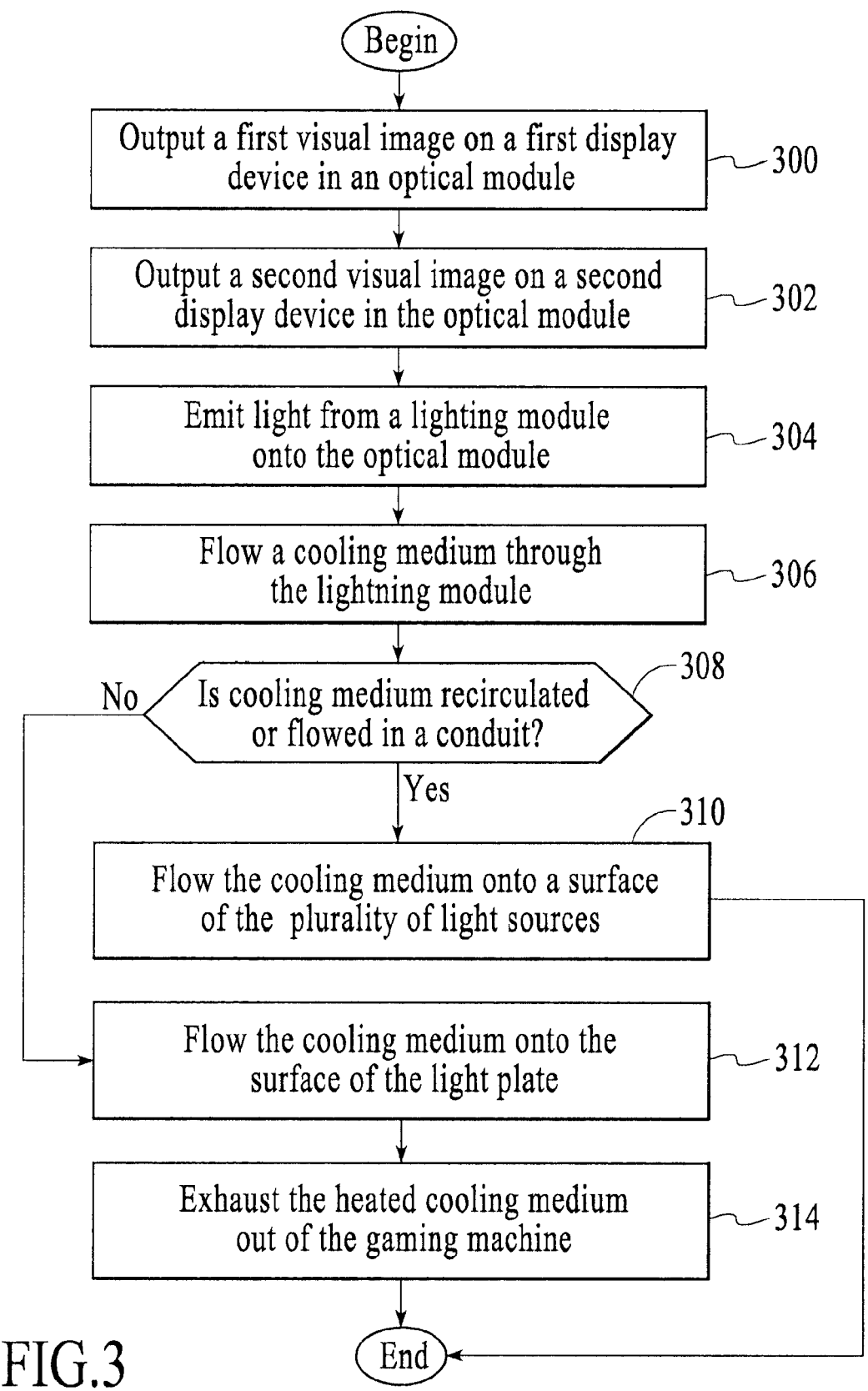
FIG. 3 illustrates a flow diagram of a method for displaying a game of chance on a gaming machine.

FIG. 3 illustrates a flow diagram of a method for displaying a game of chance on a gaming machine. A first visual image may be outputted and displayed on a first display device in an optical module at 300. The output may be in response to a control signal from a processor which may include one or more controllably transparent portions to allow a user to view a second visual image to play the game of chance outputted on a second display device in the optical module at 302. The first display device and the second display device may be arranged such that a common line of sight passes through a transparent portion of the first display device to a portion of the second display device to allow a player to view and play the game of chance.

Light may be emitted from a lighting module onto the optical module at 304. The lighting module may have a plurality of lights that generate heat. Thus, a cooling medium may be flowed through the lighting module at 306. If the cooling medium is re-circulated within the gaming machine or flowed through a conduit at 308, the cooling medium may be flowed directly on a surface of the light source at 310. Since the re-circulated does not contain any contaminations such as dirt or dust from an external air source, the air may be flowed directly onto the surface of the light source to absorb the heat generated from the light source. Alternatively, conduits may be used to flow a cooling medium along the surface of the light source. Since the cooling medium is contained within the conduit, the light source will not break down or fail prematurely from contaminates such as dust or dirt from smoking, and the like. Furthermore, the use of a conduit allows for the flexibility to use various different cooling mediums such as liquid cooling mediums or a combination of liquid and gas cooling mediums. The heated cooling medium may be cooled using heat exchangers as discussed above.

If the cooling medium is not re-circulated or flowed within a conduit at 308, the cooling medium may be directed to the surface of the plate at 312. The plurality of light sources may be enclosed between a light diffuser and the plate. The light diffuser and plate may enclose the light sources to prevent any dirt, dust, or other contaminates from contaminating the light sources. Thus, to cool the lighting module, the air may be directed along the surface of the plate to absorb the heat generated from the plurality of lights. The heated cooling medium may then be exhausted out of the gaming machine at 314.

Figure 4A:
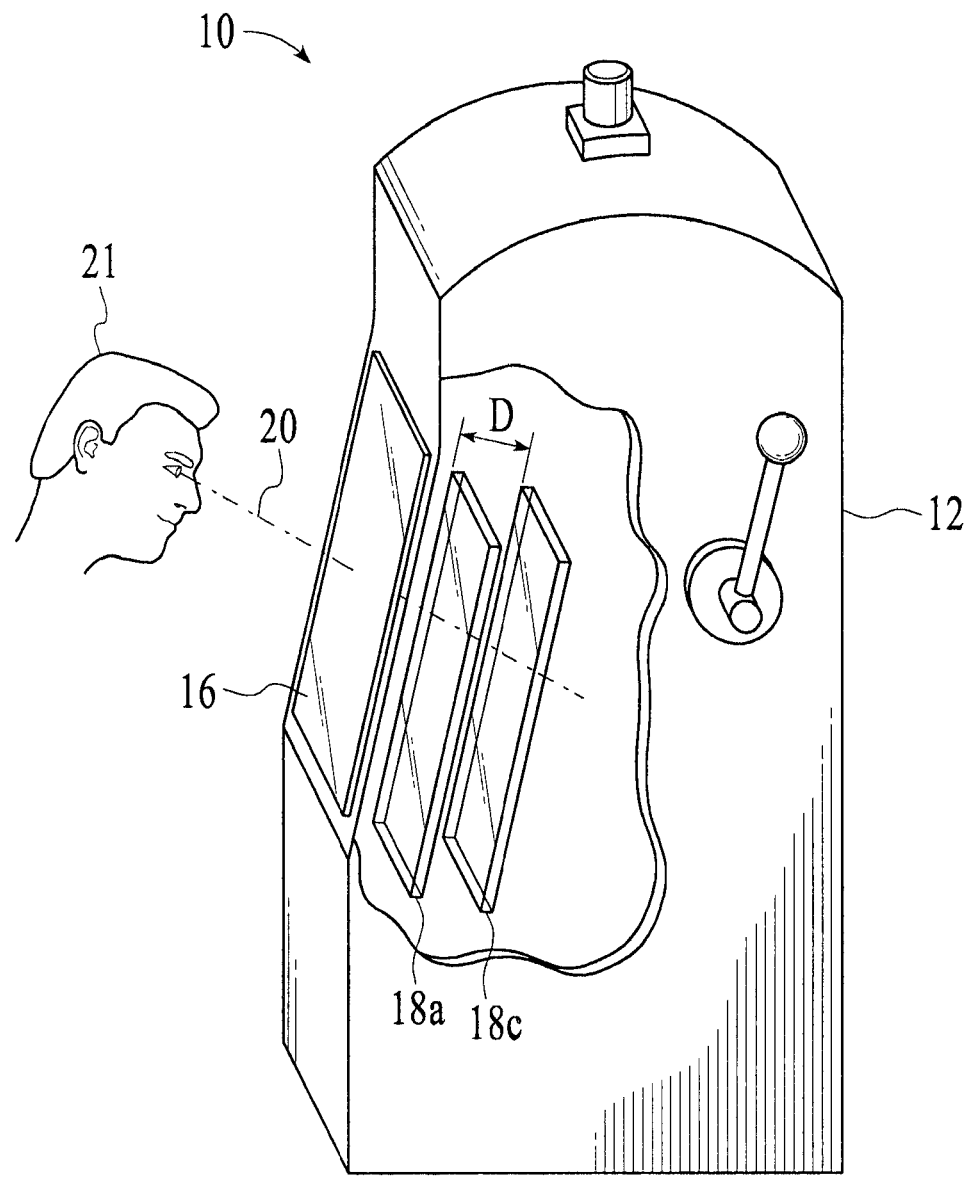
FIGS. 4A, 4B, and 4C illustrate an exemplary MLD system positioned in a gaming machine.
Figure 4B:
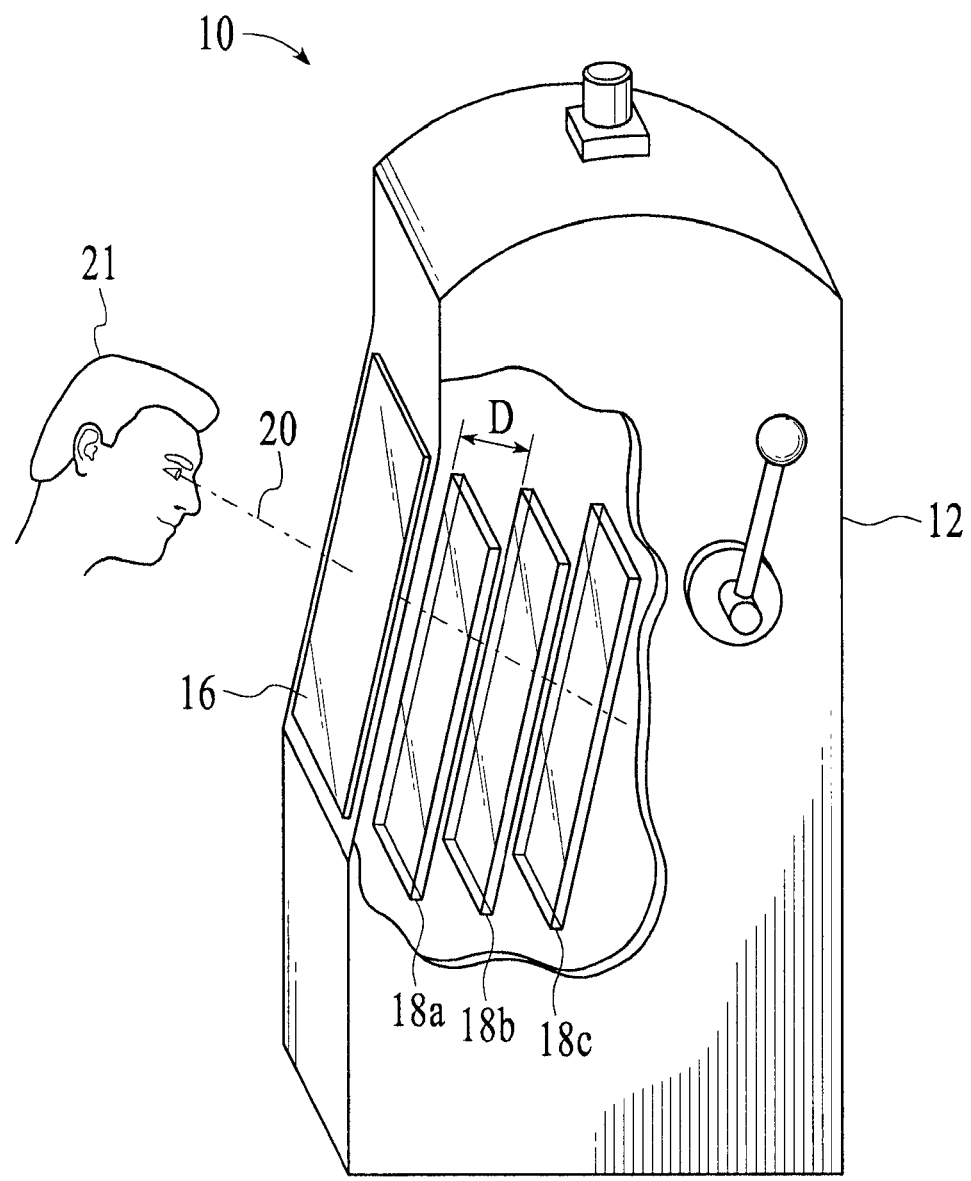
Figure 4C:
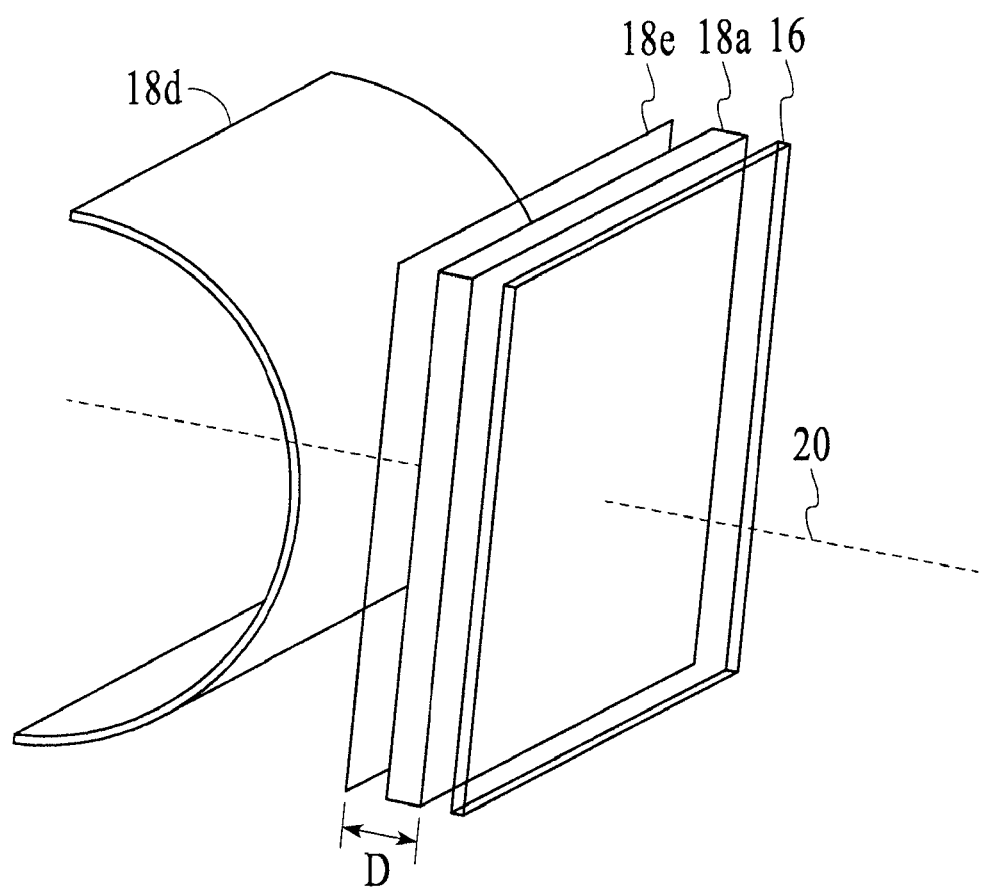

FIGS. 4A, 4B, and 4C illustrate an exemplary MLD system positioned in an exemplary gaming machine. Referring to FIG. 4A, a gaming machine 10 of a specific embodiment with layered displays includes a cabinet or housing 12 that houses exterior display device 18a, intermediate display device 18b (FIG. 4B only), interior display device 18c and a touchscreen 16.

Layered display devices may be described according to their position along a common line of sight relative to a viewer. As the terms are used herein, 'proximate' refers to a display device that is closer to a person, along a common line of sight (such as 20 in FIG. 4A), than another display device. Conversely, 'distal' refers to a display device that is farther from a person, along the common line of sight, than another. While the layered displays of FIGS. 4A and 4B are shown set back from touchscreen 16; this is for illustrative purposes and the exterior display device 18a may be closer to touchscreen 16.

The displays, however, permit digital output and all its benefits. For example, the digital domain permits external loading and changing of simulated reel games. This permits a casino or gaming establishment to change the output of images on each of the layered display devices, and their transparency, without physically altering the gaming machine or requiring maintenance. For example, the number of virtual slot reels may be changed from 3 to 5 to 9, or some other number. Symbols on each virtual slot reel may also be changed. Also, a pay table shown on display device 18a may be changed at will, in addition to changing whether a bonus or progressive game is shown on the intermediate display device. This permits the same gaming machine to play new games simply by downloading a data onto the machine. For a mechanical machine, this game change traditionally required manual and mechanical reconfiguration of a gaming machine, e.g., to change the number of reels for new reel game that requires five reels instead of three.

Figure 6:
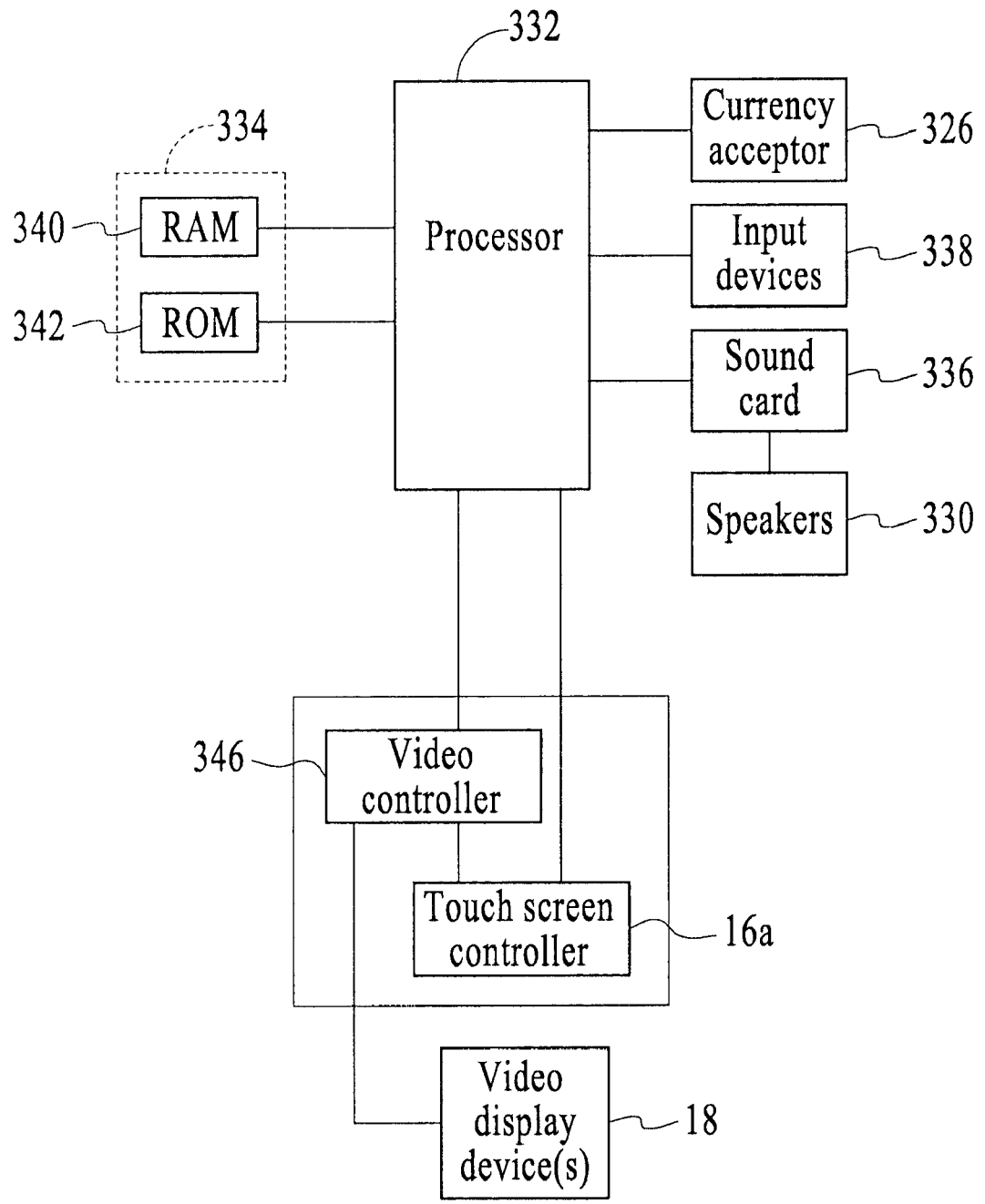
FIG. 6 illustrates a block diagram of a control configuration for use in a gaming machine.

Referring to FIGS. 4A, 4B and 6, MLDs and their operation will be further described. Processor 332 controls the operation of components in gaming machine 10 to present one or more games, receive player inputs using the touchscreen 16, and control other gaming interactions between the gaming machine and a person 21. Under the control of processor 332, display devices 18 generate visual information for game play by a person 21. As shown in FIG. 4A, there are two layered display devices 18: a first, exterior or front most display device 18a, and a backmost display screen 18c. As shown in FIG. 4B, there are three layered display devices 18: front most display device 18a, a second or intermediate display device 18b, and a backmost display screen 18c. The display devices 18a, 18b and 18c are mounted and oriented within the cabinet 12 in such a manner that a straight and common line of sight 20 intersects the display screens of all three display devices 18a, 18b and 18c. In addition, display devices 18a, 18b and 18c are all relatively flat and aligned about in parallel to provide a plurality of common lines of sight that intersect screens for all three.

The gaming machine may also include one or more light sources. In one embodiment, display devices 18 include LCD panels and at least one light source that provide light, such as white light, to the pixilated filter elements on each LCD panel. For example, the back lighting source or optical module illustrated in FIGS. 1B and 1C, may be positioned behind display device 18*c*. The pixilated panel for each parallel display device 18*a*, 18*b* and 18*c* then filters white light from the backmost backlight to controllably output color images on each screen.

The proximate display devices 18*a* and 18*b* each have the capacity to be partially or completely transparent or translucent. In a specific embodiment, the relatively flat and thin display devices 18*a* and 18*b* are liquid crystal display devices (LCDs). Other display technologies are also suitable for use. Various companies have developed relatively flat display devices that have the capacity to be transparent or translucent. One such company is Uni-Pixel Displays, Inc., Inc. of Houston Tex., which sells display screens that employ time multiplex optical shutter (TMOS) technology. This TMOS display technology includes: (a) selectively controlled pixels that shutter light out of a light guidance substrate by violating the light guidance conditions of the substrate and (b) a system for repeatedly causing such violation in a time multiplex fashion. The display screens that embody TMOS technology are inherently transparent and they can be switched to display colors in any pixel area. A transparent OLED may also be used. An electroluminescent display is also suitable for use with proximate display devices 18*a* and 18*b*. Also, Planar Systems Inc. of Beaverton Oreg. and Samsung of Korea, both produce several display devices that are suitable for use herein and that can be translucent or transparent. Kent Displays Inc. of Kent Ohio also produces Cholesteric LCD display devices that operate as a light valve and/or a monochrome LCD panel.

FIG. 4C shows another layered display device arrangement in accordance with a specific embodiment. In this arrangement, a touchscreen 16 is arranged in front of an exterior LCD panel 18*a*, an intermediate light valve 18*e* and a curved display device 18*d*.

A common line of sight 20 passes through all four layered devices. As the term is used herein, a common line of sight refers to a straight line that intersects a portion of each display device. The line of sight is a geometric construct used herein for describing a spatial arrangement of display devices. If all the proximate display devices are transparent along the line of sight, then a person should be able see through all the display devices along the line of sight. Multiple lines of sight may also be present in many instances.

Light valve 18*e* selectively permits light to pass therethrough in response to a control signal. Various devices may be utilized for the light valve 18*e*, including, but not limited to, suspended particle devices (SPD), Cholesteric LCD devices, electrochromic devices, polymer dispersed liquid crystal (PDLC) devices, etc. Light valve 18*e* switches between being transparent, and being opaque (or translucent), depending on a received control signal. For example, SPDs and PDLC devices become transparent when a current is applied and become opaque or translucent when little or no current is applied. On the other hand, electrochromic devices become opaque when a current is applied and transparent when little or no current is applied. Additionally, light valve 18*e* may attain varying levels of translucency and opaqueness. For example, while a PDLC device is generally either transparent or opaque, suspended particle devices and electrochromic devices allow for varying degrees of transparency, opaqueness or translucency, depending on the applied current level.

In one embodiment, the gaming machine includes a touchscreen 16 disposed outside the exterior display device 18*a*. Touchscreen 16 detects and senses pressure, and in some cases varying degrees of pressure, applied by a person to the touchscreen 16. Touchscreen 16 may include a capacitive, resistive, acoustic or other pressure sensitive technology. Electrical communication between touchscreen 16 and the gaming machine processor enable the processor to detect a player pressing on an area of the display screen (and, for some touchscreens, how hard a player is pushing on a particular area of the display screen). Using one or more programs stored within memory of the gaming machine, the processor enables a player to activate game elements or functions by applying pressure to certain portions of touchscreen 16. Several vendors known to those of skill in the art produce a touchscreen suitable for use with a gaming machine. Additionally, touchscreen technology which uses infrared or other optical sensing methods to detect screen contact in lieu of pressure sensing may be employed, such as the proprietary technology developed by NextWindow Ltd. of Aukland, New Zealand.

Rear display device 18*d* includes a digital display device with a curved surface. A digital display device refers to a display device that is configured to receive and respond to a digital communication, e.g., from a processor or video card. Thus, OLED, LCD and projection type (LCD or DMD) devices are all examples of suitable digital display devices. E Ink Corporation of Cambridge Mass. produces electronic ink displays that are suitable for use in rear display device 18*d*. Microscale container display devices, such as those produced SiPix of Fremont Calif., are also suitable for use in rear display device 18*d*. Several other suitable digital display devices are provided below.

In one example, some portions of proximate display device 18*a* may be significantly transparent or translucent. Pixilated element panels on many non-emissive displays such as LCD panels are largely invisible to a viewer. More specifically, many display technologies, such as electroluminescent displays and LCD panels, include portions that are transparent when no images are displayed thereon. For example, an electroluminescent display may utilize non-organic phosphors that are both transparent and emissive (such as a tOLED), and addressed through transparent row and column drivers. Pixilated element panels on LCD panels are also available in significantly transparent or translucent designs that permit a person to see through the pixilated panels when not locally displaying an image.

If used, corresponding portions of touchscreen 16 and light valve 18*e* have the capacity to be translucent or transparent in response to control signals from a processor included in the gaming machine. When portions (or all) of the screens for touchscreen 16, display devices 18*a* and 18*b*, and light valve 18*e* are transparent or translucent, a player can simultaneously see images displayed on the display screen 18*a* (and/or 18*b*)—as well as the images displayed on the interior display devices 18*c*.

In another embodiment, the layered displays in a gaming machine include a design or commercially available unit from Pure Depth of Redwood City, Calif. The Pure Depth technology incorporates two or more LCD displays into a physical unit, where each LCD display is separately addressable to provide separate or coordinated images between the LCDs. Many Pure Depth display systems include a high-brightened backlight, a rear image panel, such an active matrix color LCD, a diffuser, a refractor, and a front image plane; these devices are arranged to form a stack. The LCDs in these units are stacked at set distances.

The layered display devices 18 may be used in a variety of manners to output games on a gaming machine. In some cases, data and images displayed on the display devices 18*a* and 18*c* are positioned such that the images do not overlap (that is, the images are not superimposed). In other instances, the images overlap. It should also be appreciated that the images displayed on the display screen can fade-in fade out, pulsate, move between screens, and perform other inter-screen graphics to create additional affects, if desired.

In another embodiment, layered display devices 18 provide 3D effects. A gaming machine may use a combination of virtual 3D graphics on any one of the display devices—in addition to 3D graphics obtained using the different depths of the layered display devices. Virtual 3D graphics on a single screen typically involve shading, highlighting and perspective techniques that selectively position graphics in an image to create the perception of depth. These virtual 3D image techniques cause the human eye to perceive depth in an image even though there is no real depth (the images are physically displayed on a single display screen, which is relatively thin). Also, the predetermined distance, D (between display screens for the layered display devices) facilitates the creation of 3D effects having a real depth between the layered display devices. 3D presentation of graphic components may then use a combination of: a) virtual 3D graphics techniques on one or more of the multiple screens; b) the depths between the layered display devices; and c) combinations thereof. The multiple display devices may each display their own graphics and images, or cooperate to provide coordinated visual output. Objects and graphics in a game may then appear on any one or multiple of the display devices, where reels and other graphics on the proximate screen(s) block the view objects on the distal screen(s), depending on the position of the viewer relative to the screens. This provides actual perspective between the graphics objects, which represents a real-life component of 3D visualization (and not just perspective virtually created on a single screen).

In yet another embodiment, the multiple display devices output video for different games or purposes. For example, the interior display device may output a reel game, while the intermediate display device outputs a bonus game or pay table associated with the interior display, while the exterior and foremost display device provides a progressive game or is reserved for player interaction and output with the touch-screen. Other combinations may be used.

Reel games output by the display devices may include any video game that portrays one or more reels. Typically, the gaming machines simulate 'spinning' of the video reels using motion graphics for the symbols on the reel strips and motion graphics for the mechanical components.

Controlling transparency of the outer one or two display devices also provides game presentation versatility on a single gaming machine. In one embodiment, an outer or intermediate display device acts as a light valve that controls whether the interior display device is visible, or what portions of the interior display device are visible. For example, window portions of the intermediate display device may be left transparent to permit viewing of a select number of video reels arranged behind the light valve.

In another embodiment, the outer display device completely blocks out the interior display device, where the outermost display device is now solely visible and used for game presentation. The gaming machine now resembles a conventional gaming machine that only includes a single LCD panel. The gaming machine may then respond to digital controls to switch between a reel game, a multi-layer/multi-display game, and a simple one-panel LCD game. Other uses of the layered displays are possible and contemplated.

Gaming machine 10 uses the layered display devices 18 to show visual information on the different screens that a player can simultaneously see. Additional sample game presentations and uses of the layered display devices will now be discussed.

In another example, the gaming machine generates a game image on an interior display device and a flashing translucent image on a proximate display device. The game could for example, be reels or one or more wheels, and a flashing image on the proximate display could be a translucent line that indicates the payline(s) on the reels. Since some games permit multiple paylines based on the person's wager, this permits the game to show multiple paylines responsive to the person's actions. Alternatively, the proximate display may show a symbol or message that provides a player with helpful information such as a hint for playing the game. Notably, each of these examples allows the person to play the game while viewing the flashing image without having to change his or her line of sight or having to independently find such information from another portion of the gaming machine.

In one embodiment, the gaming machine presents different game types on the layered display devices. For example, the interior and backmost display device may output a main game with reels while a proximate display device shows a bonus game or progressive game. The bonus game or progressive game may result from playing the main game. Again, this permits the player to play the game while viewing a flashing bonus image without having to change his or her line of sight or having to independently find such information from another portion of the gaming machine.

Visual information on each of the distal screens remains visible as long as there are transparent or semi-transparent portions on the proximate screens that permit a user to see through these portions. Transparent portions may be selectively designed and timely activated according to game design, and changed according to game play. For example, if a game designer wants a person to focus on a bonus game on the front screen, they can use an intermediate light valve to black out a distal reel game.

In one embodiment, the layered display devices are all-digital and permit reconfiguration in real time. This permits new or different games to be downloaded onto a gaming machine, and reconfiguration of the three display devices to present a new or different game using any combination of the display devices. Game aspects changed in this manner may include: reel symbols, the paytable, the game theme, wager denominations, glass plate video data, reel strips, etc. For a casino, or other gaming establishment, this permits a single gaming machine to offer multiple games without the need for gaming machine maintenance or replacement when a new game is desired by casino management or customer demand. On one day, the gaming machine may offer games using all the layered display devices. The next day, the same gaming machine may offer a game that only uses an outer LCD panel and touchscreen, where a shutter (or other technology on front display) blocks out the back display devices. Some other subset of the layered displays may also be used. This permits dual-dynamic display device reconfiguration and/or game reconfiguration, at will, by downloading commands to the gaming machine that determine a) what game(s) is played, and b) what display device(s) is used. For example, this allows the same gaming machine to run a reel game one day and a video poker game another day that uses some subset of the display devices.

This reconfiguration of display devices used and games also enables new uses for gaming machines. Traditionally, a casino or other gaming establishment purchased a gaming machine and offered games only according to its display capabilities. If a casino purchased 250 gaming machines that only had LCD panels, and then later decided they wanted to implement reel games or other games that required more than an LCD panel, they were forced to purchase new gaming machines. Gaming machine 10, however, solves this problem for a casino. Accordingly, gaming machines as described herein permit a gaming establishment to switch the number of display devices used by a gaming machine to display a game.

One business advantage of this dual-dynamic display device reconfiguration and/or game reconfiguration is navigating gaming regulations imposed by different jurisdictions, which often change over time. First, each jurisdiction imposes its own set of rules on what games are locally permissible. Second, gaming regulators in each jurisdiction often change the local rules. This is particularly common for new gaming regulators and jurisdictions allowing casinos for the first time. The new gaming regulators may only permit class 2 games at first (e.g., bingo) and later permit class 3 games (video poker and reel games, one year later). Gaming machine 10 allows a casino in this jurisdiction to adapt, instantly, to a regulations change with a) new games and b) new display device arrangements that were already on gaming machine 10 but not previously used. Thus, when some jurisdictions limit the number and types of games that can be played, gaming machines described herein allow a casino to switch games—on the fly without significant gaming machine maintenance or downtime in the casino—when jurisdiction rules change.

Additionally, the enhanced utility and regulatory acceptance of a viable stepper simulation using video in lieu of mechanical reels permits mechanical-simulated games in new environments. Some jurisdictions do not permit the use of actual mechanical reel machines but do allow all forms of video-based gaming machines, which permits embodiments described herein to service mechanical reel customers in these jurisdictions.

One of the display devices in a layered arrangement may also output live video such as television or a movie (or parts of either). For example, the television or movie video may be output on a rear display while a game is played on a proximate display. This permits a person to watch television or a movie while playing a game at a gaming machine, without changing position or line of sight to switch between the game and live video. The live video may also be related to the game being played to enhance enjoyment of that game, e.g., a science fiction movie related to a science fiction game being played or a 1960's television show related to a 1960's television game. The video may also play commercials for the gaming establishment, such as advertisements and infomercials for businesses related to a casino or businesses that pay for the advertising opportunity. Advertisements may include those for a local restaurant, local shows, —house offers and promotions currently offered, menus for food, etc.

Figure 5A:
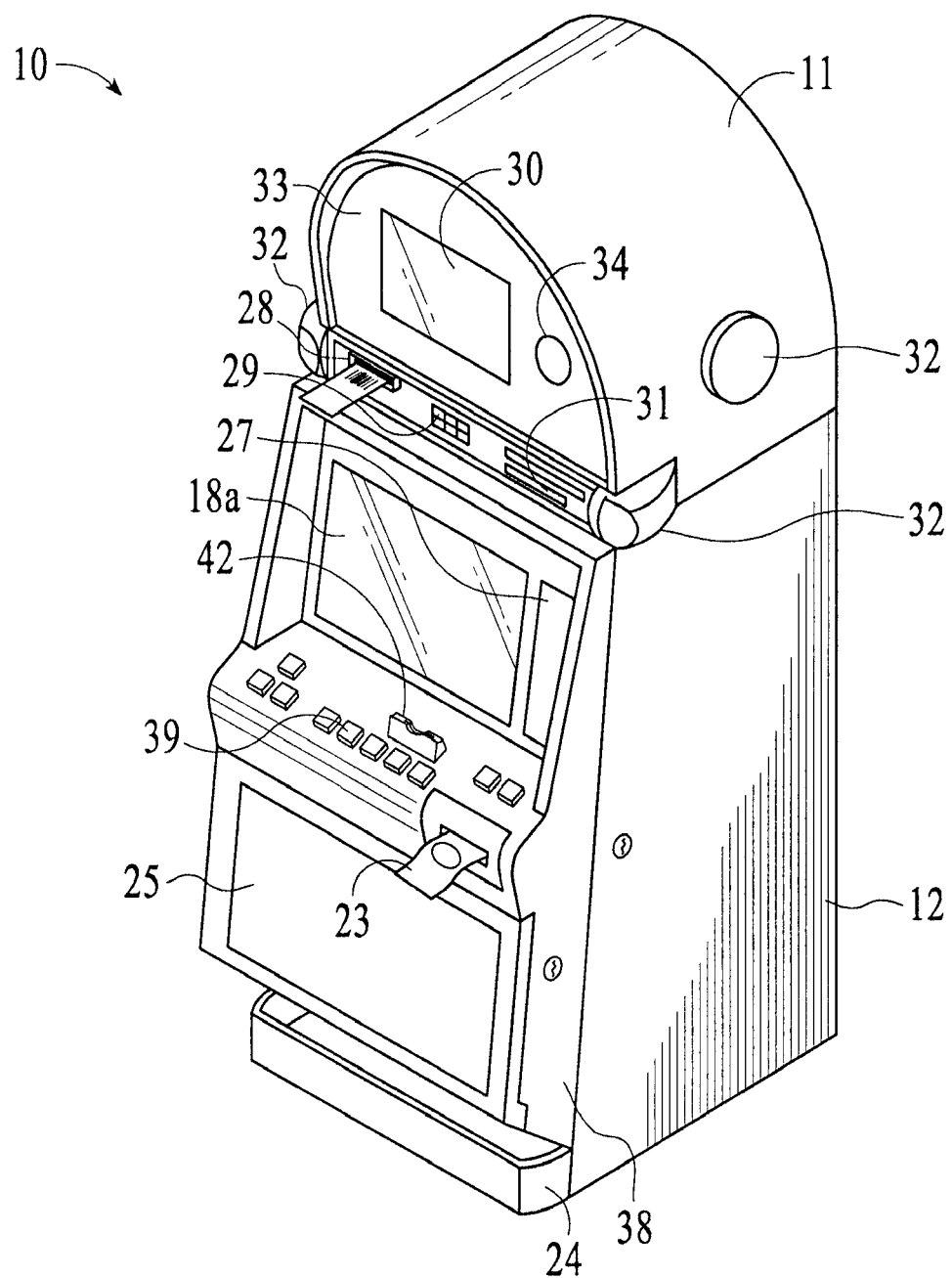
FIGS. 5A and 5B illustrate an exemplary gaming machine.
Figure 5B:
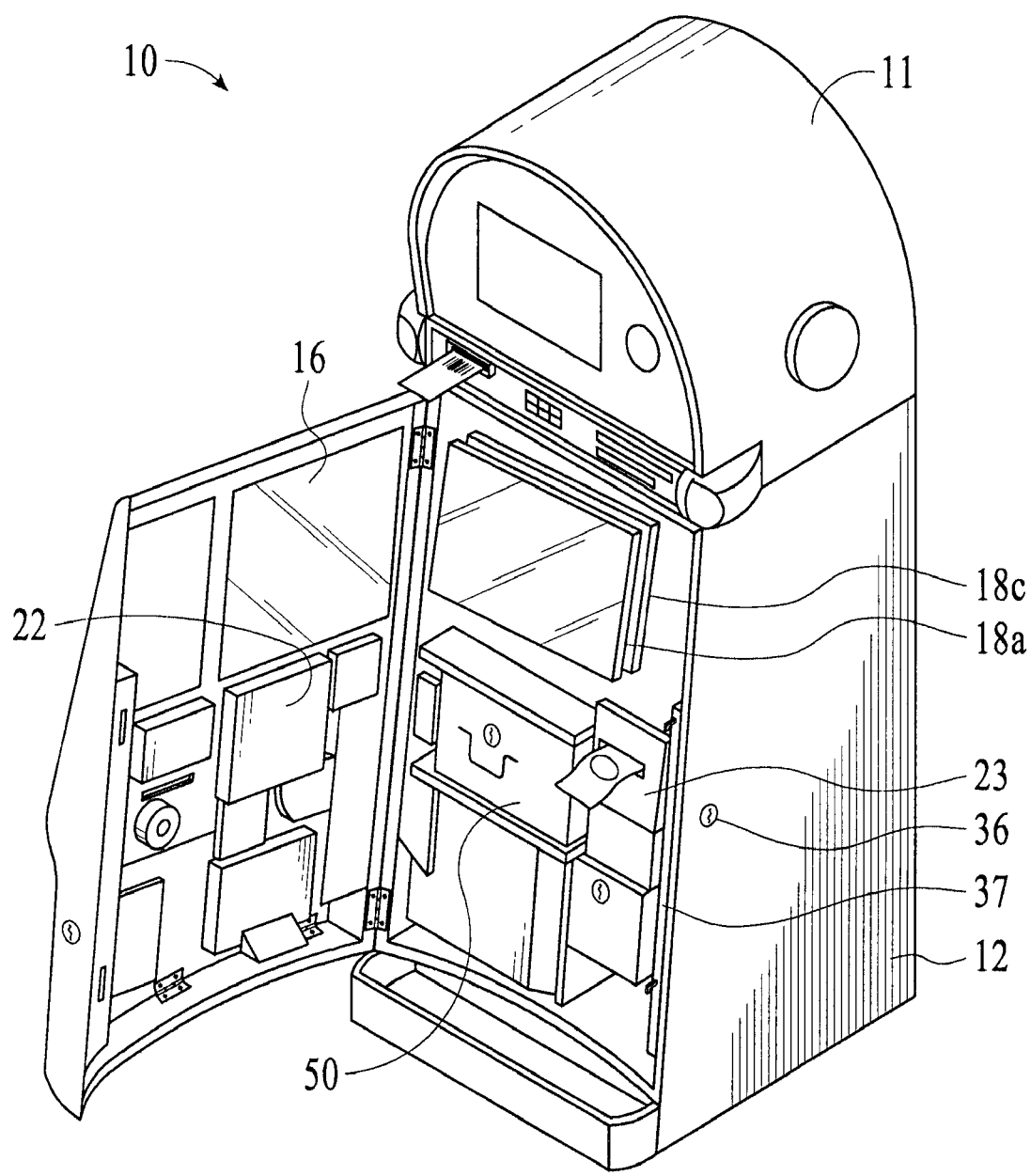

Embodiments described herein may be implemented on a wide variety of gaming machines. Although illustrated with the use of gaming machines, this is not intended to be limiting as the embodiments discussed above may also be used in non-gaming, consumer goods such as televisions and the like. For example, the video reels may be output by a gaming machine as provided by IGT of Reno, Nev. Gaming machines from other manufacturers may also employ embodiments described herein. FIGS. 5A and 5B illustrate a sample gaming machine 10 in accordance with a specific embodiment. Gaming machine 10 is suitable for providing a game of chance and displaying video data that simulates a mechanical reel.

Gaming machine 10 includes a top box 11 and a main cabinet 12, which defines an interior region of the gaming machine. The cabinet includes one or more rigid materials to separate the machine interior from the external environment, is adapted to house a plurality of gaming machine components within or about the machine interior, and generally forms the outer appearance of the gaming machine. Main cabinet 12 includes a main door 38 on the front of the machine, which opens to provide access to the interior of the machine. The interior may include any number of internal compartments, e.g., for cooling and security purposes. Attached to the main door or cabinet are typically one or more player-input switches or buttons 39; one or more money or credit acceptors, such as a coin acceptor 42, and a bill or ticket scanner 23; a coin tray 24; and a belly glass 25. Viewable through main door 38 is the exterior display monitor 18a and one or more information panels 27.

Top box 11, which typically rests atop of the main cabinet 12, may also contain a ticket printer 28, a keypad 29, one or more additional displays 30, a card reader 31, one or more speakers 32, a top glass 33 and a camera 34. Other components and combinations are also possible, as is the ability of the top box to contain one or more items traditionally reserved for main cabinet locations, and vice versa.

It will be readily understood that gaming machine 10 can be adapted for presenting and playing any of a number of games and gaming events, particularly games of chance involving a player wager and potential monetary payout, such as, for example, a digital slot machine game and/or any other video reel game, among others. While gaming machine 10 is usually adapted for live game play with a physically present player, it is also contemplated that such a gaming machine may also be adapted for remote game play with a player at a remote gaming terminal. Such an adaptation preferably involves communication from the gaming machine to at least one outside location, such as a remote gaming terminal itself, as well as the incorporation of a gaming network that is capable of supporting a system of remote gaming with multiple gaming machines and/or multiple remote gaming terminals.

Gaming machine 10 may also be a "dummy" machine, kiosk or gaming terminal, in that all processing may be done at a remote server, with only the external housing, displays, and pertinent inputs and outputs being available to a player. Further, it is also worth noting that the term "gaming machine" may also refer to a wide variety of gaming machines in addition to traditional free standing gaming machines. Such other gaming machines can include kiosks, set-top boxes for use with televisions in hotel rooms and elsewhere, and many server based systems that permit players to log in and play remotely, such as at a personal computer or PDA. All such gaming machines can be considered "gaming machines" for embodiments described herein.

FIGS. 5A and 5B illustrate an exemplary gaming machine. With reference to FIG. 5B, the gaming machine of FIG. 5A is illustrated in perspective view with its main door opened. In additional to the various exterior items described above, such as top box 11, main cabinet 12 and primary displays 18, gaming machine 10 also comprises a variety of internal components. As will be readily understood by those skilled in the art, gaming machine 10 contains a variety of locks and mechanisms, such as main door lock 36 and latch 37. Internal portions of coin acceptor 22 and bill or ticket scanner 23 can also be seen, along with the physical meters associated with these peripheral devices. Processing system 50 includes computer architecture, as will be discussed in further detail below.

When a person wishes to play a gaming machine 10, he or she provides coins, cash or a credit device to a scanner included in the gaming machine. The scanner may comprise a bill scanner or a similar device configured to read printed information on a credit device such as a paper ticket or magnetic scanner that reads information from a plastic card. The credit device may be stored in the interior of the gaming machine. During interaction with the gaming machine, the person views game information using a display. Usually, during the course of a game, a player is required to make a number of decisions that affect the outcome of the game. The player makes these choices using a set of player-input switches. A game ends with the gaming machine providing an outcome to the person, typically using one or more of the displays.

After the player has completed interaction with the gaming machine, the player may receive a portable credit device from the machine that includes any credit resulting from interaction with the gaming machine. By way of example, the portable credit device may be a ticket having a dollar value produced by a printer within the gaming machine. A record of the credit value of the device may be stored in a memory device provided on a gaming machine network (e.g., a memory device associated with validation terminal and/or processing system in the network). Any credit on some devices may be used for further games on other gaming machines 10. Alternatively, the player may redeem the device at a designated change booth or pay machine.

Gaming machine 10 can be used to play any primary game, bonus game, progressive or other type of game. Other wagering games can enable a player to cause different events to occur based upon how hard the player pushes on a touch screen. For example, a player could cause reels or objects to move faster by pressing harder on the exterior touch screen. In these types of games, the gaming machine can enable the player to interact in the 3D by varying the amount of pressure the player applies to a touchscreen.

As indicated above, gaming machine 10 also enables a person to view information and graphics generated on one display screen while playing a game that is generated on another display screen. Such information and graphics can include game paytables, game-related information, entertaining graphics, background, history or game theme-related information or information not related to the game, such as advertisements. The gaming machine can display this information and graphics adjacent to a game, underneath or behind a game or on top of a game. For example, a gaming machine could display paylines on a proximate display screen and also display a reel game on a distal display screen, and the paylines could fade in and fade out periodically.

A gaming machine includes one or more processors and memory that cooperate to output games and gaming interaction functions from stored memory. FIG. 6 illustrates a block diagram of a control configuration for use in a gaming machine. Processor 332 is a microprocessor or microcontroller-based platform that is capable of causing a display system 18 to output data such as symbols, cards, images of people, characters, places, and objects which function in the gaming device. Processor 332 may include a commercially available microprocessor provided by a variety of vendors known to those of skill in the art. Gaming machine 10 may also include one or more application-specific integrated circuits (ASICs) or other hardwired devices. Furthermore, although the processor 332 and memory device 334 reside on each gaming machine, it is possible to provide some or all of their functions at a central location such as a network server for communication to a playing station such as over a local area network (LAN), wide area network (WAN), Internet connection, microwave link, and the like.

Memory 334 may include one or more memory modules, flash memory or another type of conventional memory that stores executable programs that are used by the processing system to control components in a layered display system and to perform steps and methods as described herein. Memory 334 can include any suitable software and/or hardware structure for storing data, including a tape, CD-ROM, floppy disk, hard disk or any other optical or magnetic storage media. Memory 334 may also include a) random access memory (RAM) 340 for storing event data or other data generated or used during a particular game and b) read only memory (ROM) 342 for storing program code that controls functions on the gaming machine such as playing a game.

A player uses one or more input devices 338, such as a pull arm, play button, bet button or cash out button to input signals into the gaming machine. One or more of these functions could also be employed on a touchscreen. In such embodiments, the gaming machine includes a touch screen controller 16a that communicates with a video controller 346 or processor 332. A player can input signals into the gaming machine by touching the appropriate locations on the touchscreen.

Processor 332 communicates with and/or controls other elements of gaming machine 10. For example, this includes providing audio data to sound card 336, which then provides audio signals to speakers 330 for audio output. Any commercially available sound card and speakers are suitable for use with gaming machine 10. Processor 332 is also connected to a currency acceptor 326 such as the coin slot or bill acceptor. Processor 332 can operate instructions that require a player to deposit a certain amount of money in order to start the game.

Although the processing system shown in FIG. 6 is one specific processing system, it is by no means the only processing system architecture on which embodiments described herein can be implemented. Regardless of the processing system configuration, it may employ one or more memories or memory modules configured to store program instructions for gaming machine network operations and operations associated with layered display systems described herein. Such memory or memories may also be configured to store player interactions, player interaction information, and other instructions related to steps described herein, instructions for one or more games played on the gaming machine, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

The processing system may offer any type of primary game, bonus round game or other game. In one embodiment, a gaming machine permits a player to play two or more games on two or more display screens at the same time or at different times. For example, a player can play two related games on two of the display screens simultaneously. In another example, once a player deposits currency to initiate the gaming device, the gaming machine allows a person to choose from one or more games to play on different display screens.

In yet another example, the gaming device can include a multi-level bonus scheme that allows a player to advance to different bonus rounds that are displayed and played on different display screens.

While embodiments and applications of this invention have been shown and described, it would be apparent to those skilled in the art having the benefit of this disclosure that many more modifications than mentioned above are possible without departing from the inventive concepts herein.

What is claimed is:

1. A gaming machine, comprising:
   a cabinet defining a first interior region of the gaming machine, the cabinet adapted to house a plurality of gaming machine components;
   an optical module positioned within or about the first interior region and having a first display device; and
   a lighting module positioned within or about the first interior region and having:
     an enclosure defining a second interior region, the enclosure having:
       a light film defining a first surface,
       a plate defining a second surface offset from the first surface by a gap and having a third surface on an opposite side of the plate from the second surface, and
       a plurality of light sources positioned in the gap between the first surface and the second surface; and
   a cooling component adapted to recirculate a cooling medium within the enclosure and around the plate such that the cooling medium flows across the second surface in a first direction and across the third surface in a second direction substantially opposite the first direction so as to transfer heat generated from the plurality of light sources out of the lighting module,
   wherein the lighting module is removably coupled to the optical module such that the lighting module may be removed and replaced without disturbing the optical module, and
   wherein the cooling component comprises an airflow plenum coupled to the third surface, the airflow plenum having a first plurality of channels on a first side and a second plurality of channels on a second side, wherein:
     the first plurality of channels and the plate are configured to direct the cooling medium across the plate towards a first end of the plate and into the gap between the first surface and the second surface,
     the second surface and the first surface are configured to direct the cooling medium flowed into the gap from the first end across the plate, past the light sources, and towards a second end of the plate opposite the first end, and
     the second plurality of channels and the plate are configured to direct the cooling medium from the second end and towards the first end via the second plurality of channels.

2. The gaming machine of claim 1, further comprising:
   a second display device, the second display device arranged relative to the first display device such that a common line of sight passes through a portion of the first display device to a portion of the second display device;
   a memory; and
   a gaming controller configured to execute instructions stored on the memory that
     a) cause the second display device to display data for a game of chance;
     b) cause the first display device to display one or more transparent portions and one or more non-transparent portions, wherein one or more portions of the data for the game of chance displayed on the second display device are visible through the one or more transparent portions; and
     c) permit game play of the game of chance displayed by the second display device.

3. The gaming machine of claim 1, wherein the cooling component further comprises:
   a first plurality of fans disposed in between the plate and the airflow plenum and configured to direct the cooling medium into the first plurality of channels and towards the first end;
   a plurality of heat sinks piercing the airflow plenum, each of the heat sinks having a bottom portion and a top portion, wherein:
     the bottom portion protrudes into a volume bounded by the airflow plenum and the plate, and
     the top portion protrudes away from the plate and the airflow plenum and is exposed to ambient air within the gaming machine; and
   a second plurality of fans proximate to the top portions of the plurality of heat sinks and configured to direct the ambient air through the top portions of the plurality of heat sinks.

4. The gaming machine of claim 1, wherein lighting module is configured to re-circulate the cooling medium within a volume substantially bounded by the enclosure and the airflow plenum.

5. The gaming machine of claim 3, wherein:
   the second plurality of channels are configured to direct the cooling medium towards the bottom portion of each of the heat sinks, and
   the lighting module is configured to transfer heat from the cooling medium to the ambient air via the heat sinks.

6. The gaming machine of claim 1,
   wherein the lighting module is configured to direct the cooling medium from the first plurality of channels onto the plate to transfer heat generated from the plurality of light sources to the cooling medium.

7. The gaming machine of claim 1, wherein the light source in the plurality of light sources are selected from the group consisting of cold cathode fluorescent lamps, an array of light emitting diodes, and incandescent lamps.

8. The gaming machine of claim 1, wherein the plurality of light sources further comprises a plurality of redundant light sources.

9. The gaming machine of claim 1, wherein the lighting module and the optical module are separate from each other and are both hermetically sealed.

10. A gaming machine, comprising:
    a cabinet defining a first interior region of the gaming machine, the cabinet adapted to house a plurality of gaming machine components;
    an optical module positioned within or about the first interior region, the optical module having a first display device configured to output a visual image in response to at least one control signal;
    a lighting module positioned within or about the first interior region, having:
      a light film;
      a plate offset from the light film by a gap;
      a plurality of light sources positioned in the gap between the light film and the plate; and
      at least one conduit positioned between the plurality of light sources and the plate, the conduit and the plate configured to recirculate a cooling medium around the plate and within the lighting module to transfer heat generated from the plurality of light sources, wherein the lighting module is removably coupled to the optical module such that the lighting module may be removed and replaced without disturbing the optical module, and an airflow plenum coupled to the plate, the airflow plenum having a first set of at least one conduits on a first side and a second set of at least one conduits on a second side, wherein the first set of at least one conduits and the plate are configured to direct the cooling medium across the plate towards a first end of the plate and into the gap between a first surface of the light film and a second surface of the plate, the second surface and the first surface are configured to direct the cooling medium flowed into the gap from the first end across the plate, past the light sources, and towards a second end of the plate opposite the first end, and the second set of at least one conduits and the plate are configured to direct the cooling medium from the second end and towards the first end via the second set of at least one conduits.

11. The gaming machine of claim 10, further comprising:
a second display device, the second display device arranged relative to the first display device such that a common line of sight passes through a portion of the first display device to a portion of the second display device;
a memory; and
a gaming controller configured to execute instructions stored on the memory that
a) cause the second display device to display data for a game of chance,
b) cause the first display device to display one or more transparent portions and one or more non-transparent portions, wherein one or more portions of the data for the game of chance displayed on the second display device are visible through the one or more transparent portions; and
c) permit game play of the game of chance displayed by the second display.

12. The gaming machine of claim 10, wherein the cooling medium is a liquid.

13. The gaming machine of claim 10, further comprising:
a plurality of fans coupled to the at least one conduit, the plurality of fans configured to direct the cooling medium through the at least one conduit;
a plurality of heat sinks coupled to the at least one conduit, the heat sinks configured to transfer heat from the cooling medium to an ambient air source.

14. The gaming machine of claim 10, wherein the plurality of light sources is selected from the group consisting of cold cathode fluorescent lamps, an array of light emitting diodes, and incandescent lamps.

15. The gaming machine of claim 11, wherein the lighting module further comprises a plurality of redundant light sources in communication with the at least one logic device.

16. The gaming machine of claim 10, wherein the plurality of light sources is configured to be removable from the gaming machine without requiring removal of the optical module.

17. A lighting module for an optical module including a display device, the lighting module comprising:

a light film defining a first surface;
a plate defining a second surface offset from the first surface by a gap and having a third surface on an opposite side of the plate from the second surface;
a plurality of light sources positioned in the gap between the first surface and the second surface;
a cooling component configured to recirculate a cooling medium within the lighting module and around the plate such that the cooling medium flows across the second surface in a first direction and across the third surface in a second direction substantially opposite the first direction so as to transfer heat generated from the plurality of light sources out of the lighting module, wherein:
the plurality of light sources are configured to provide light to the optical module when the lighting module is coupled to the optical module, and
the lighting module is configured to be removably coupled to the optical module such that the lighting module removable from the optical module without disturbing the optical module,
wherein the cooling component comprises an airflow plenum coupled to the third surface, the airflow plenum having a first plurality of channels on a first side and a second plurality of channels on a second side, wherein:
the first plurality of channels and the plate are configured to direct the cooling medium across the plate towards a first end of the plate and into the gap between the first surface and the second surface,
the second surface and the first surface are configured to direct the cooling medium flowed into the gap from the first end across the plate, past the light sources, and towards a second end of the plate opposite the first end, and
the second plurality of channels and the plate are configured to direct the cooling medium from the second end and towards the first end via the second plurality of channels.

18. The lighting module of claim 17, further comprising the optical module, wherein the optical module includes a first display device and a second display device, the first display device offset from, and overlapping with, the second display device.

19. The lighting module of claim 17, wherein the cooling component further comprises:
an enclosure,
the enclosure and the airflow plenum substantially defining an interior volume containing the plate, the plurality of light sources, and the light film, wherein
the airflow plenum is located proximate to a side of the plate opposite the second surface;
a first plurality of fans disposed in between the plate and the airflow plenum and configured to direct the cooling medium into the first plurality of channels and towards the first end;
a plurality of heat sinks piercing the airflow plenum, each of the heat sinks having a bottom portion and a top portion, wherein:
the bottom portion protrudes into a volume bounded by the airflow plenum and the plate, and
the top portion protrudes away from the plate and the airflow plenum and is exposed to ambient air; and
a second plurality of fans proximate to the top portions of the plurality of heat sinks and configured to direct the ambient air through the top portions of the plurality of heat sinks.

20. The lighting module of claim 19, wherein the lighting module is configured to re-circulate the cooling medium within the interior volume.

21. The lighting module of claim 19, wherein:
the second plurality of channels is configured to direct the cooling medium towards the bottom portion of each of the heat sinks, and
the lighting module is configured to transfer heat from the cooling medium to the ambient air via the heat sinks.

22. The lighting module of claim 17,
wherein the lighting module is configured to direct the cooling medium from the first plurality of channels onto a surface of the plate to transfer heat generated from the plurality of light sources.

23. The lighting module of claim 17, wherein the plurality of light sources are selected from the group consisting of cold cathode fluorescent lamps, an array of light emitting diodes, and incandescent lamps.

24. The lighting module of claim 18, wherein the plurality of light sources further comprises a plurality of redundant light sources in communication with the at least one logic device.

25. The lighting module of claim 17, wherein the lighting module is hermetically sealed.

26. A method comprising:
outputting a first visual image of a game of chance on a first display device of a gaming machine in response to a control signal from a logic device, the first visual image including one or more controllably transparent portions;
outputting a second visual image of the game of chance on a second display device such that one or more portions of the second visual image are visible through the one or more transparent portions, the first and second display devices forming an optical module;
emitting light from a lighting module coupled to, and separate from, the optical module to provide backlighting to the optical module, the lighting module having a plurality of light sources arrayed in front of a plate and a plenum, the plenum having a first plurality of channels on a first side and a second plurality of channels on a second side; and
recirculating a cooling medium around the plate and within the lighting module to transfer the heat generated from the plurality of light sources out of the lighting module,
wherein the first plurality of channels and the plate are configured to direct the cooling medium across the plate towards a first end of the plate and into a gap between a first surface of a light film and a second surface of the plate,
wherein the second surface and the first surface are configured to direct the cooling medium flowed into the gap from the first end across the plate, past the light sources, and towards a second end of the plate opposite the first end, and
wherein the second plurality of channels and the plate are configured to direct the cooling medium from the second end and towards the first end via the second plurality of channels.

27. The method of claim 26, further comprising positioning the plurality of light sources between an optical film and the plate within the lighting module.

28. The method of claim 27, further comprising flowing the cooling medium on a surface of the lighting module to transfer heat generated by the plurality of light sources.

29. The method of claim 26, further comprising detecting, by a logic device, when a light source in the plurality of light sources no longer emits light.

30. The method of claim 29, further comprising transmitting a signal from the logic device to one of the light sources in a plurality of redundant light sources to emit light in response to detecting when a light source in the plurality of light sources no longer emits light.

31. An apparatus to display a game of chance on a gaming machine, comprising:
a first display to output an image in response to a control signal from a logic device, the first visual image including one or more controllably transparent portions;
a second display to output a game of chance, the second display arranged such that a common line of sight passes through a transparent portion of the first display device to a portion of the second display device, the first and second display devices forming an optical module;
means for emitting light from a lighting module to the optical module to backlight the first and second visual images, the lighting module having a plurality of light sources;
a cooling component configured to recirculate a cooling medium within the lighting module and around a plate to transfer heat generated by the plurality of light sources out of the lighting module, wherein the plurality of light sources are arrayed in front of the plate; and
means for removing the lighting module without disturbing the optical module,
wherein the cooling component comprises an airflow plenum coupled to a third surface of the plate, the airflow plenum having a first plurality of channels on a first side and a second plurality of channels on a second side, wherein:
the first plurality of channels and the plate are configured to direct the cooling medium across the plate towards a first end of the plate and into a gap between a first surface of a light film and a second surface of the plate,
the second surface and the first surface are configured to direct the cooling medium flowed into the gap from the first end across the plate, past the light sources, and towards a second end of the plate opposite the first end, and
the second plurality of channels and the plate are configured to direct the cooling medium from the second end and towards the first end via the second plurality of channels.

32. The apparatus of claim 31, further comprising means for positioning the plurality of light sources between an optical film and the plate.

33. The apparatus of claim 32, further comprising means for flowing the cooling medium on a surface of the lighting module to absorb heat generated by the plurality of light sources.

34. The apparatus of claim 31, further comprising means for detecting, by the logic device, when a light source of the plurality of light sources no longer emits light.

35. The apparatus of claim 34, further comprising means for transmitting a signal from the logic device to a light source of a plurality of redundant light sources to emit light in response to detecting that the light source of the plurality of light sources no longer emits light.

* * * * *